(12) United States Patent
Kaufhold et al.

(10) Patent No.: US 9,990,687 B1
(45) Date of Patent: Jun. 5, 2018

(54) SYSTEMS AND METHODS FOR FAST AND REPEATABLE EMBEDDING OF HIGH-DIMENSIONAL DATA OBJECTS USING DEEP LEARNING WITH POWER EFFICIENT GPU AND FPGA-BASED PROCESSING PLATFORMS

(71) Applicant: Deep Learning Analytics, LLC, Arlington, VA (US)

(72) Inventors: John Patrick Kaufhold, Arlington, VA (US); Michael Jeremy Trammell, Portland, OR (US)

(73) Assignee: Deep Learning Analytics, LLC, Arlington, VA (US)

( * ) Notice: Subject to any disclaimer, the term of this patent is extended or adjusted under 35 U.S.C. 154(b) by 0 days. days.

(21) Appl. No.: 15/454,845

(22) Filed: Mar. 9, 2017

Related U.S. Application Data

(60) Provisional application No. 62/448,170, filed on Jan. 19, 2017.

(51) Int. Cl.
*G06K 9/00* (2006.01)
*G06T 1/00* (2006.01)
(Continued)

(52) U.S. Cl.
CPC ............... *G06T 1/005* (2013.01); *G06K 9/66* (2013.01); *H04N 1/32154* (2013.01); *H04N 1/32267* (2013.01)

(58) Field of Classification Search
None
See application file for complete search history.

(56) References Cited

U.S. PATENT DOCUMENTS

2015/0032449 A1  1/2015  Sainath et al.
2016/0071010 A1*  3/2016  Tian .................. G06N 3/08
                                                 706/25

OTHER PUBLICATIONS

Belkin, M., & Niyogi, P. (2007). Convergence of Laplacian eigenmaps. Advances in Neural Information Processing Systems, 19, 129.

(Continued)

*Primary Examiner* — Atiba O Fitzpatrick
(74) *Attorney, Agent, or Firm* — Clyde E. Findley

(57) ABSTRACT

Embodiments of the present invention are directed to providing new systems and methods for using deep learning techniques to generate embeddings for high dimensional data objects that can both simulate prior art embedding algorithms and also provide superior performance compared to the prior art methods. Deep learning techniques used by embodiments of the present invention to embed high dimensional data objects may comprise the following steps: (1) generating an initial formal embedding of selected high-dimensional data objects using any of the traditional formal embedding techniques; (2a) designing a deep embedding architecture, which includes choosing the types and numbers of inputs and outputs, types and number of layers, types of units/nonlinearities, and types of pooling, for example, among other design choices, typically in a convolutional neural network; (2b) designing a training strategy; (2c) tuning the parameters of a deep embedding architecture to reproduce, as reliably as possible, the generated embedding for each training sample; (3) optionally deploying the trained deep embedding architecture to convert new high dimensional data objects into approximately the same embedded space as found in step (1); and optionally (4) feeding the computed embeddings of high dimensional objects to an application in a deployed embodiment.

12 Claims, 9 Drawing Sheets

(51) Int. Cl.
  H04N 1/32  (2006.01)
  G06K 9/66  (2006.01)

(56) References Cited

OTHER PUBLICATIONS

Bengio, Y., Paiement; J. F., Vincent, P., Delalleau, O., Le Roux, N., & Ouimet, M. (2004). Out-of-sample extensions for lle, isomap, mds, eigenmaps, and spectral clustering. Advances in Neural Information Processing Systems, 16, 177-184.

Chaudhury, K. N. (2013). Acceleration of the shiftable algorithm for bilateral filtering and nonlocal means. IEEE Transactions on Image Processing, 22(4), 1291-1300.

Cook, J., Sutskever, I., Mnih, A., & Hinton, G. E. (2007). Visualizing Similarity Data with a Mixture of Maps. AISTATS (vol. 7, pp. 67-74). Retrieved from http://www.jmlr.org/proceedings/papers/v2/cook07a/cook07a.pdf.

Demartines, P., & Hérault, J. (1997). Curvilinear component analysis: A self-organizing neural network for nonlinear mapping of data sets. IEEE Transactions on Neural Networks, 8(1), 148-154.

Duchi, J., Kazan, E., & Singer, Y. (2011). Adaptive subgradient methods for online learning and stochastic optimization. The Journal of Machine Learning Research, 12, 2121-2159.

Glorot, X., & Bengio, Y. (2010). Understanding the difficulty of training deep feedforward neural networks. AISTATS (vol. 9, pp. 249-256). Retrieved from http://www.jmlr.org/proceedings/papers/v9/glorot10a/glorot10a.pdf?hc_location=ufi.

Gupta, S., Agrawal, A., Gopalakrishnan, K., & Narayanan, P. (2015). Deep learning with limited numerical precision. CoRR, Abs/1502.02551, 392. Retrieved from http://www.jmlr.org/proceedings/papers/v37/gupta15.pdf.

Hinton, G. E., & Roweis, S. T. (2002). Stochastic neighbor embedding. Advances in neural information processing systems (pp. 833-840). Retrieved from http://machinelearning.wustl.edu/mlpapers/paper_files/AA45.pdf.

Hinton, G. E., & Salakhutdinov, R. R. (2006). Reducing the dimensionality of data with neural networks. Science, 313 (5786), 504-507.

Hinton, G., Vinyals, O., & Dean, J. (2015). Distilling the knowledge in a neural network. arXiv Preprint arXiv:1503.02531. Retrieved from http://arxiv.org/abs/1503.02531.

Iandola, F. N., Moskewicz, M. W., Ashraf, K., Han, S., Daily, W. J., & Keutzer, K. (2016). SqueezeNet: AlexNet-level accuracy with 50x fewer parameters and< 1MB model size. arXiv Preprint arXiv:1602.07360. Retrieved from http://arxiv.org/abs/1602.07360.

Ioffe, S., & Szegedy, C. (2015). Batch normalization: Accelerating deep network training by reducing internal covariate shift. arXiv Preprint arXiv:1502.03167. Retrieved from http://arxiv.org/abs/1502.03167.

Krizhevsky, A., Sutskever, I., & Hinton, G. (2012). Imagenet classification with deep convolutional neural networks. Advances in Neural Information Processing Systems 25 (pp. 1106-1114). Retrieved from http://books.nips.cc/papers/files/nips25/NIPS2012_0534.pdf.

Long, J., Shelhamer, E., & Darrell, T. (2015). Fully convolutional networks for semantic segmentation. Proceedings of the IEEE Conference on Computer Vision and Pattern Recognition (pp. 3431-3440). Retrieved from http://www.cv-foundation.org/openaccess/content_cvpr_2015/html/Long_Fully_Convolutional_Networks_2015_CVPR_paper.html.

Lowe, D. G. (1999). Object recognition from local scale-invariant features. Computer vision, 1999. Proceedings of the Seventh IEEE International Conference on (vol. 2, pp. 1150-1157). IEEE. Retrieved from http://ieeexplore.ieee.org/xpls/abs_all.jsp?arnumber=790410.

Mikolov, T., Le, Q. V., & Sutskever, I. (2013). Exploiting similarities among languages for machine translation. arXiv Preprint arXiv:1309.4168. Retrieved from http://arxiv.org/abs/1309.4168.

Nesterov, Y., & others. (2007). Gradient methods for minimizing composite objective function. UCL. Retrieved from: http://dial.uclouvain.be/handle/boreal:5122.

Norouzi, M., Mikolov T., Bengio, S., Singer, Y., Shlens, J., Frome, A., . . . Dean, J. (2013). Zero-shot learning by convex combination of semantic embeddings. arXiv Preprint arXiv:1312.5650. Retrieved from http://arxiv.org/abs/1312.5650.

Roweis, S. T., & Saul, L. K. (2000). Nonlinear dimensionality reduction by locally linear embedding. Science, 290 (5500), 2323-2326.

Shepard, R. N. (1980). Multidimensional scaling, tree-fitting, and clustering. Science, 210(4468), 390-398.

Snoek, J., Larochelle, H., & Adams, R. P. (2012). Practical bayesian optimization of machine learning algorithms. Advances in neural information processing systems (pp. 2951-2959). Retrieved from http://papers.nips.cc/paper/4522-practical.

Song, L., Gretton, A., Borgwardt, K. M., & Smola, A. J. (2007). Colored maximum variance unfolding. Advances in neural information processing systems (pp. 1385-1392). Retrieved from http://machinelearning.wustl.edu/mlpapers/paper_files/NIPS2007_492.pdf.

Sun, B., & Saenko, K. (2014). From Virtual to Reality: Fast Adaptation of Virtual Object Detectors to Real Domains. BMVC (vol. 1, p. 3). Retrieved from http://www.bmva.org/bmvc/2014/files/paper062.pdf.

Uncanny valley. (Sep. 11, 2016). Wikipedia, the free encyclopedia. Retrieved from https://en.wikipedia.org/w/index.php?title=Uncanny_valley&oldid=738941388.

Van Der Maaten, L. (2009). Learning a parametric embedding by preserving local structure. RBM, 500, 500.

Van Der Maaten, L. (2013). Barnes-hut-sne. arXiv Preprint arXiv:1301.3342. Retrieved from http://arxiv.org/abs/1301.3342.

Van Der Maaten, L. (2014). Accelerating t-SNE using tree-based algorithms. Journal of Machine Learning Research, 15(1), 3221-3245.

Van der Maaten, L., & Hinton, G. (2008). Visualizing data using t-SNE. Journal of Machine Learning Research, 9 (2579-2605), 85.

Wang, J., Song, Y., Leung, T., Rosenberg, C., Wang, J., Philbin, J., . . . Wu, Y. (2014). Learning fine-grained image similarity with deep ranking. Proceedings of the IEEE Conference on Computer Vision and Pattern Recognition (pp. 1386-1393). Retrieved from http://www.cv-foundation.org/openaccess/content_cvpr_2014/html/Wang_Learnig_Fine-grained_Image_2014_CVPR_paper.html.

Weinberger, K. Q., & Saul, L. K. (2006). An introduction to nonlinear dimensionality reduction by maximum variance unfolding. AAAI (vol. 6, pp. 1683-1686). Retrieved from http://www.aaai.org/Papers/AAAI/2006/AAAI06-280.pdf.

Zeiler, M. D. (2012). ADADELTA: An adaptive learning rate method. arXiv Preprint arXiv:1212.5701. Retrieved from http://arxiv.org/abs/1212.5701.

Glorot, X., Bordes, A., & Bengio, Y. (2011). Deep Sparse Rectifier Neural Networks. International Conference on Artificial Intelligence and Statistics (AISTATS).

Gisbrecht, A., Lueks, W., Mokbel, B., Hammer, B., (2012). Out-of-Sample Kernel Extensions for Nonparametric Dimensionality Reduction. European Symposium on Artificial Neural Networks, Computational Intelligence and Machine Learning (ESANN 2012).

Gong, D., Zhao, X., Medioni, G. (2012). Robust Multiple Manifolds Structure Learning. Proceedings of the 29th International Conference on Machine Learning, Edinburgh, Scotland, UK, 2012.

Memisevic, R., Hinton, G. (2005). Multiple Relational Embedding. In: Saul, L.K., Weiss, Y., Bottou, L. (eds). Advances in Neural Information Processing Systems 17, pp. 913-.920. MIT Press, Cambridge (2005).

Min, R., van der Maaten L., Yuan, Z., Bonner, A., Zhang, Z. (2010). Deep Supervised t-Distributed Embedding. Appearing in Proceedings of the 27th International Conference on Machine Learning, Haifa, Israel, 2010.

Salakhutdinov, R., Hinton, G. (2007). Learning a Nonlinear Embedding by Preserving Class Neighbourhood Structure. Proceedings of the Eleventh International Conference on Artificial Intelligence and Statistics, PMLR 2:412-419, 2007.

(56) References Cited

OTHER PUBLICATIONS

Sedlmair, M., Munzner, T. (2013). Empirical Guidance on Scatterplot and Dimension Reduction Technique Choices. IEEE Transactions on Visualization and Computer Graphics, Dec. 2013.

Yang, Z., Peltonen, J., Kaski, S. (2013). Scalable Optimization of Neighbor Embedding for Visualization. Proceedings of the 30th International Conference on Ma-chine Learning, Atlanta, Georgia, USA, 2013.

Amazon Mechanical Turk—Welcome. (n.d.). Retrieved Sep. 25, 2016, from https://requester.mturk.com/case_studies.2.

De Ridder, D., & Duin, R. P. (1997). Sammon's mapping using neural networks: a comparison. Pattern Recognition Letters, 18(11), 1307-1316.

LabelMe. The Open annotation tool. (n.d.). Retrieved Sep. 23, 2016, from http://labelme.csail.mit.edu/Release3.0/browserTools/php/mechanical_turk.php.

Lee, J. A., & Verleysen, M. (2007). Nonlinear Dimensionality Reduction. Springer Science & Business Media.

Sorokin, A., Forsyth, D. (2008). Utility data annotation with Amazon Mechanical Turk. IEEE 2008.

* cited by examiner

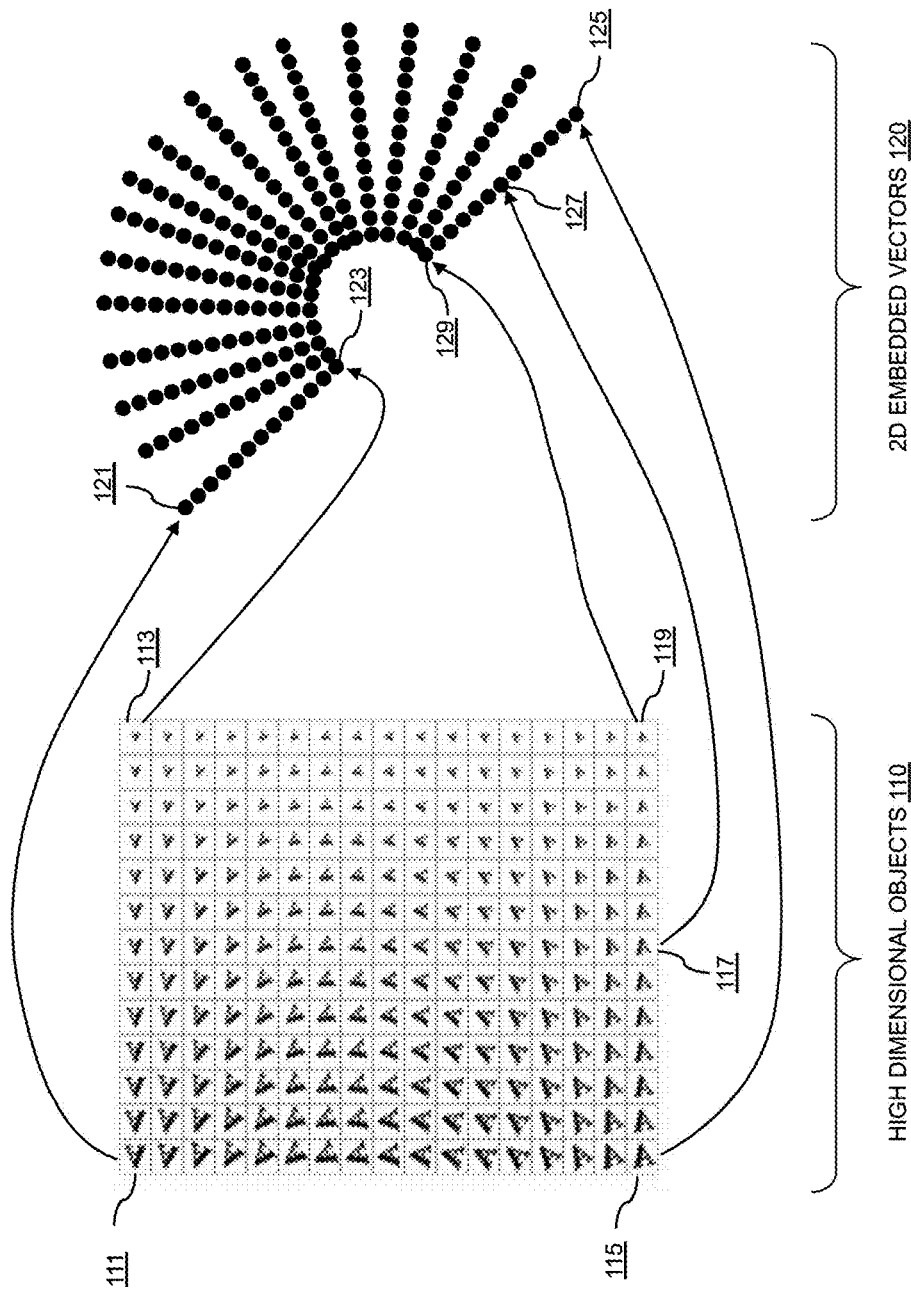
FIG. 1 — 1:1 Pairing Between High Dimensional Objects and Embedded Low Dimensional Vectors.

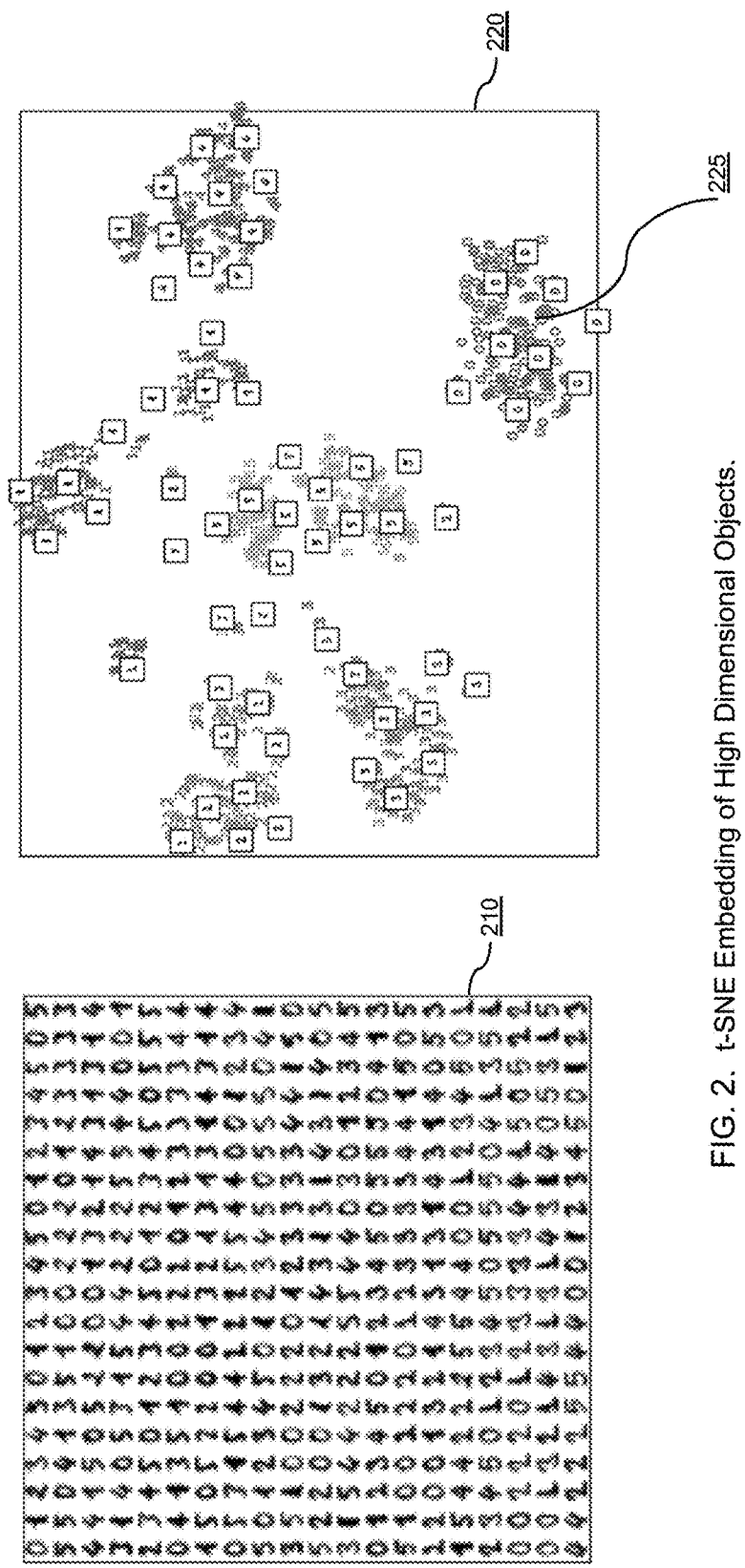
FIG. 2. t-SNE Embedding of High Dimensional Objects.

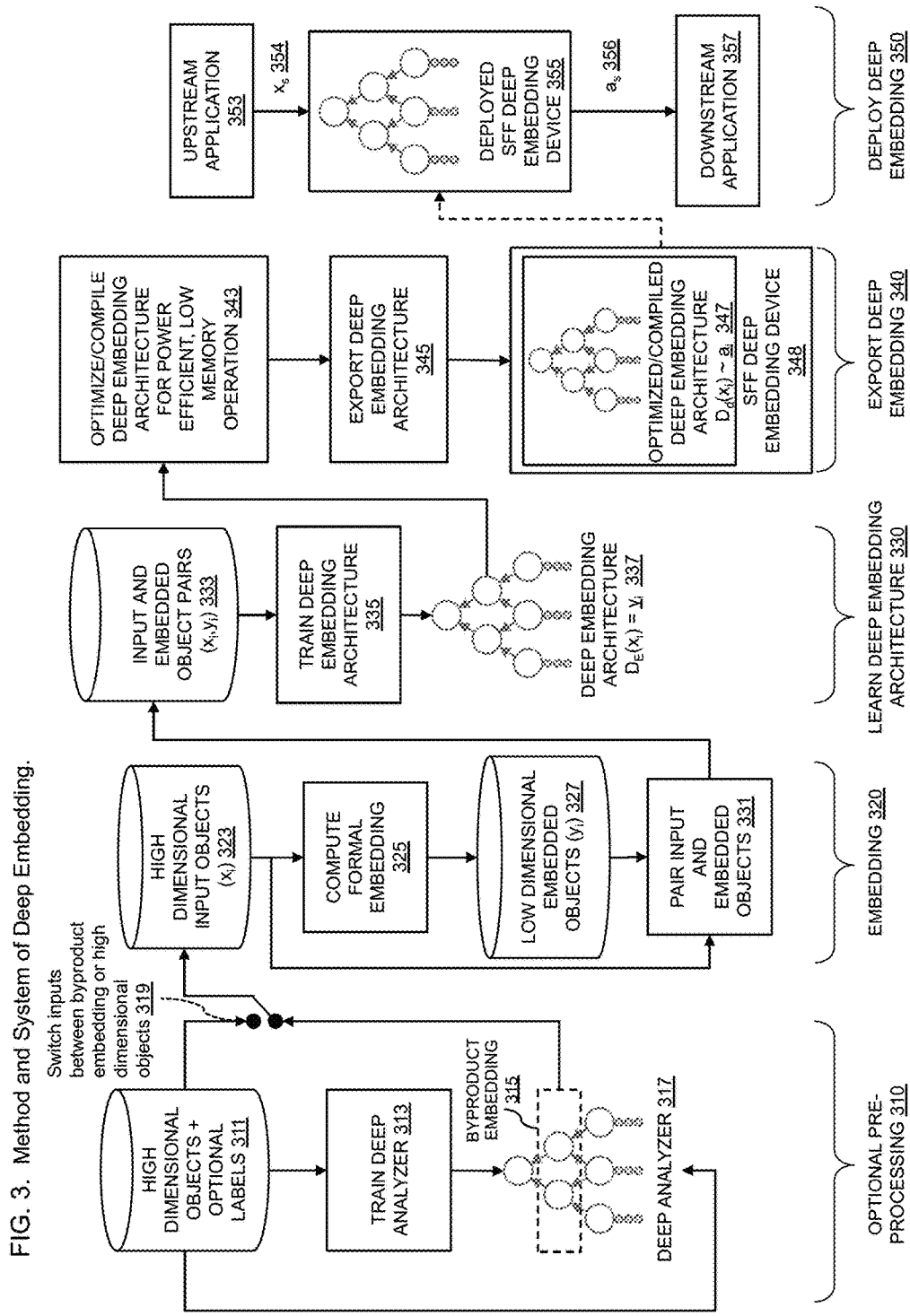
FIG. 3. Method and System of Deep Embedding.

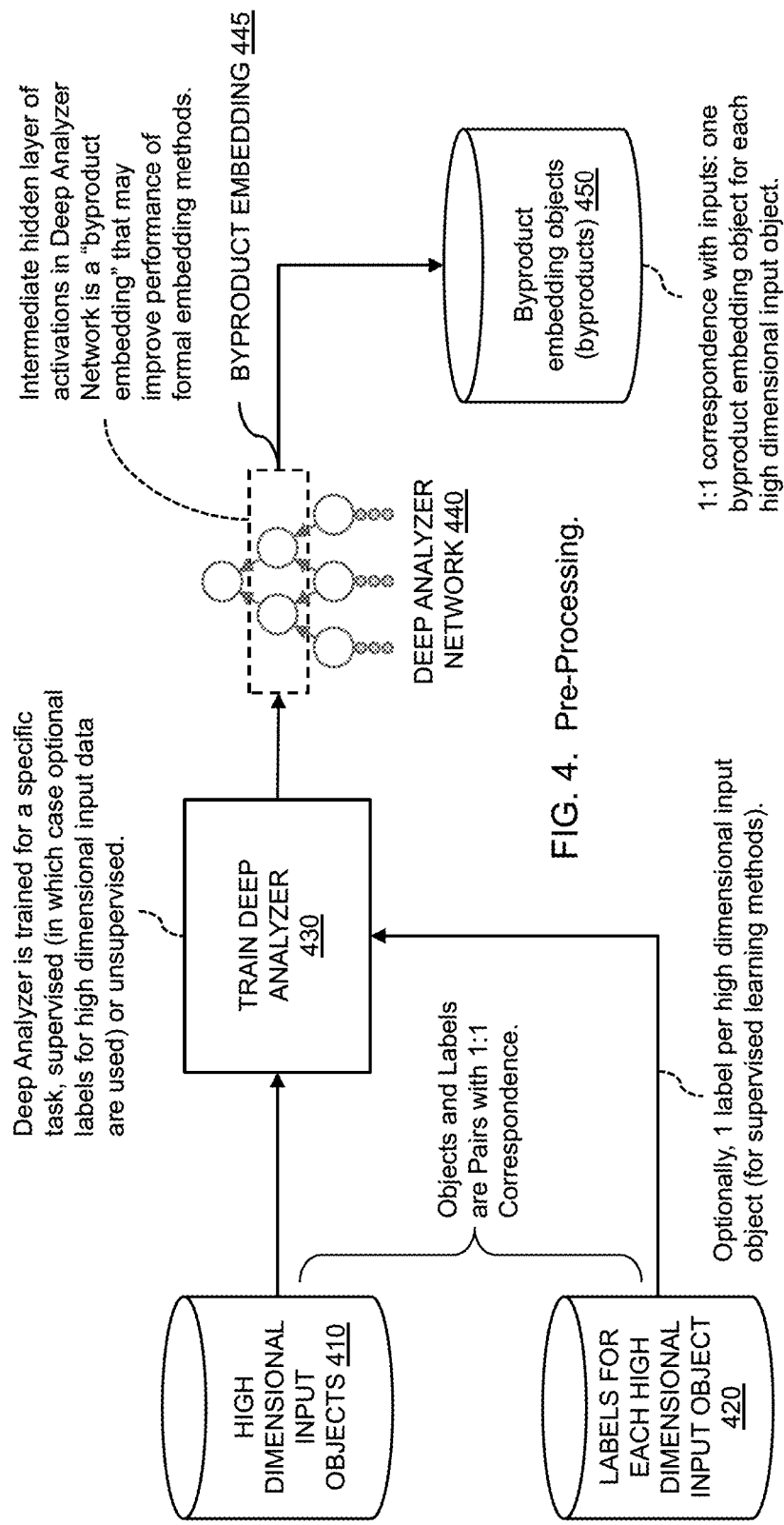
FIG. 4. Pre-Processing.

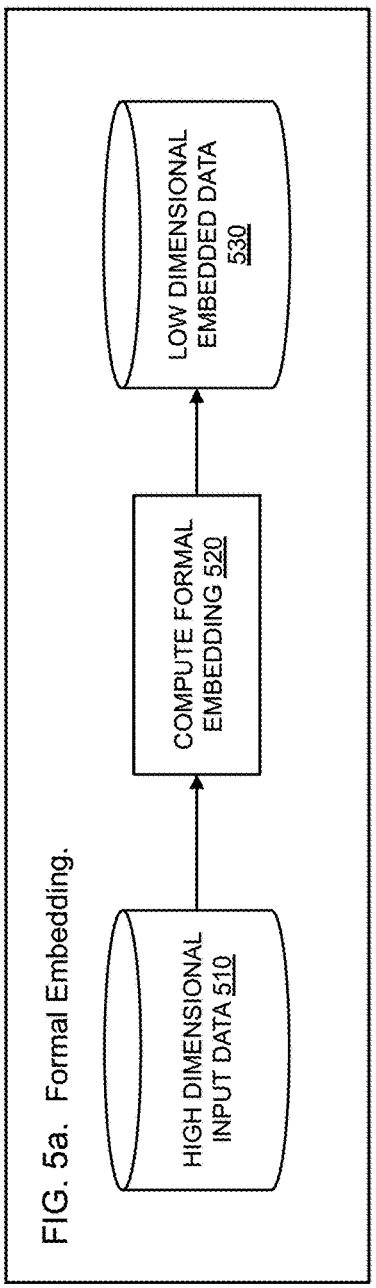
FIG. 5a. Formal Embedding.
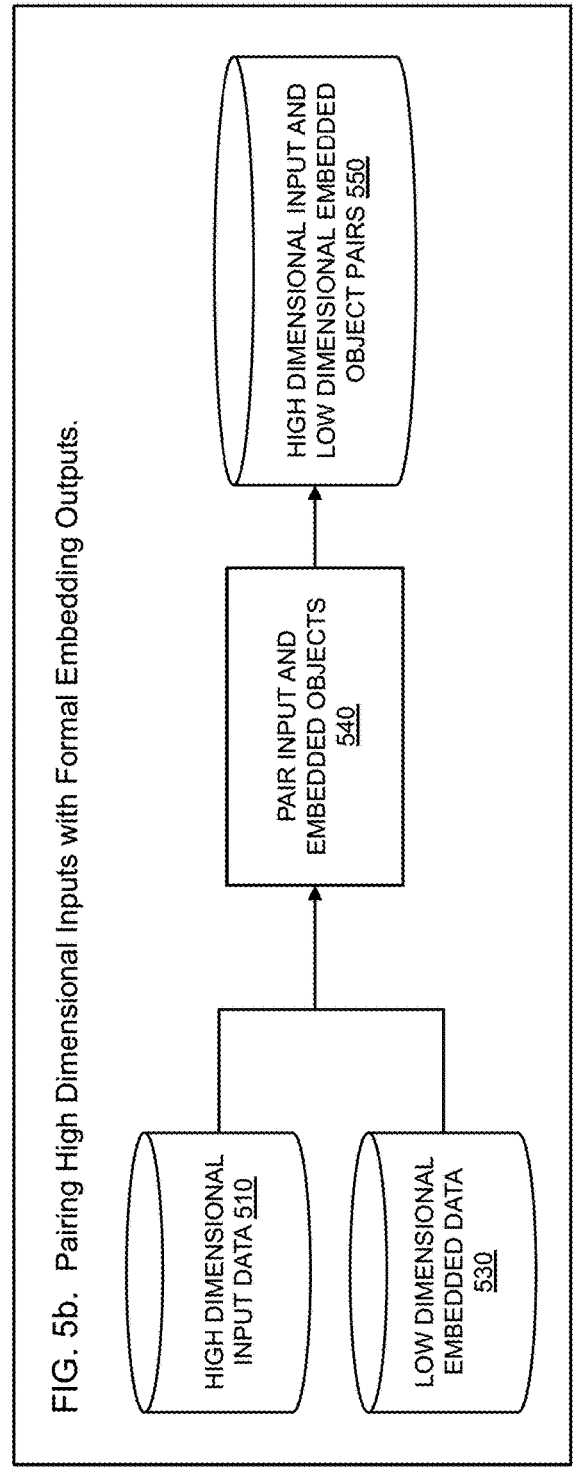
FIG. 5b. Pairing High Dimensional Inputs with Formal Embedding Outputs.

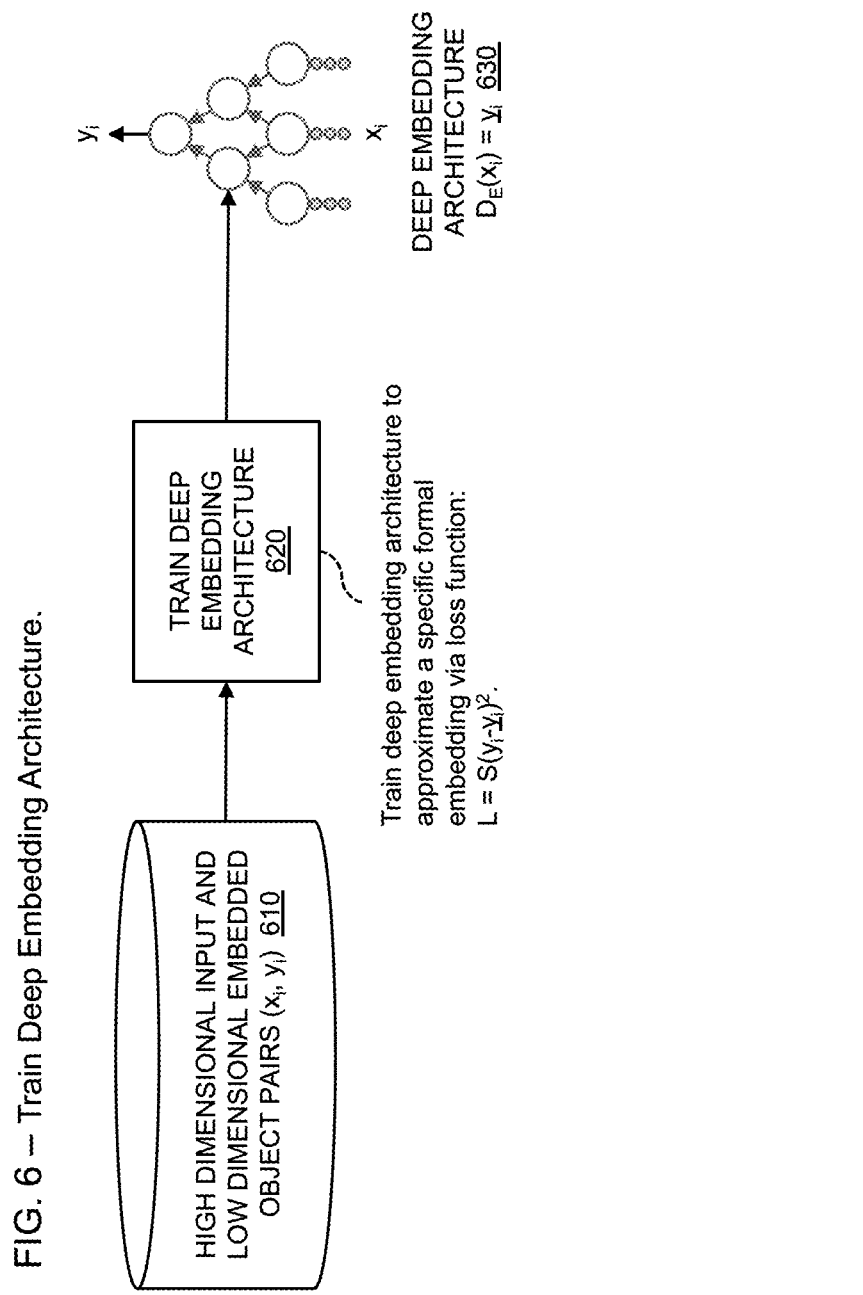
FIG. 6 – Train Deep Embedding Architecture.

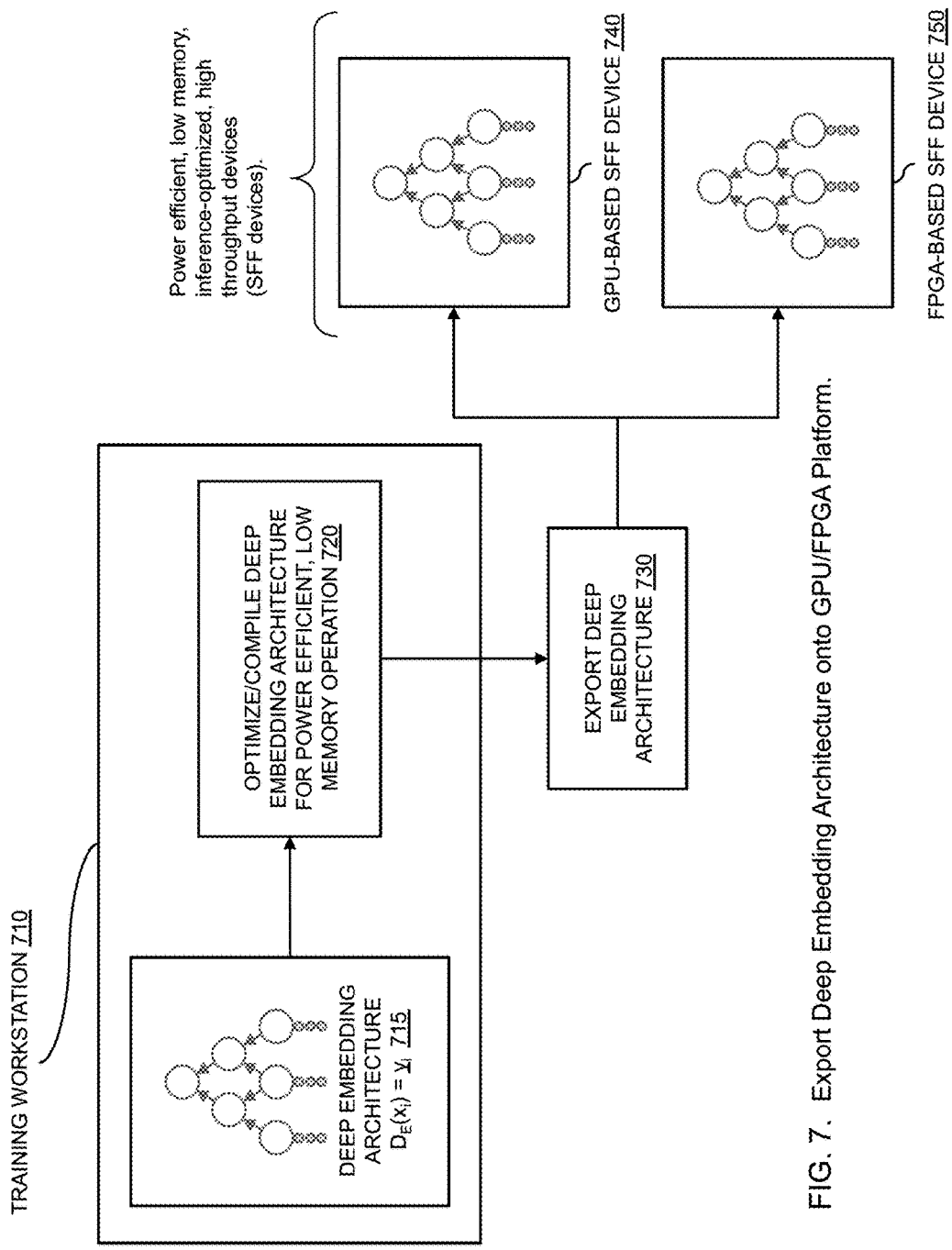
FIG. 7. Export Deep Embedding Architecture onto GPU/FPGA Platform.

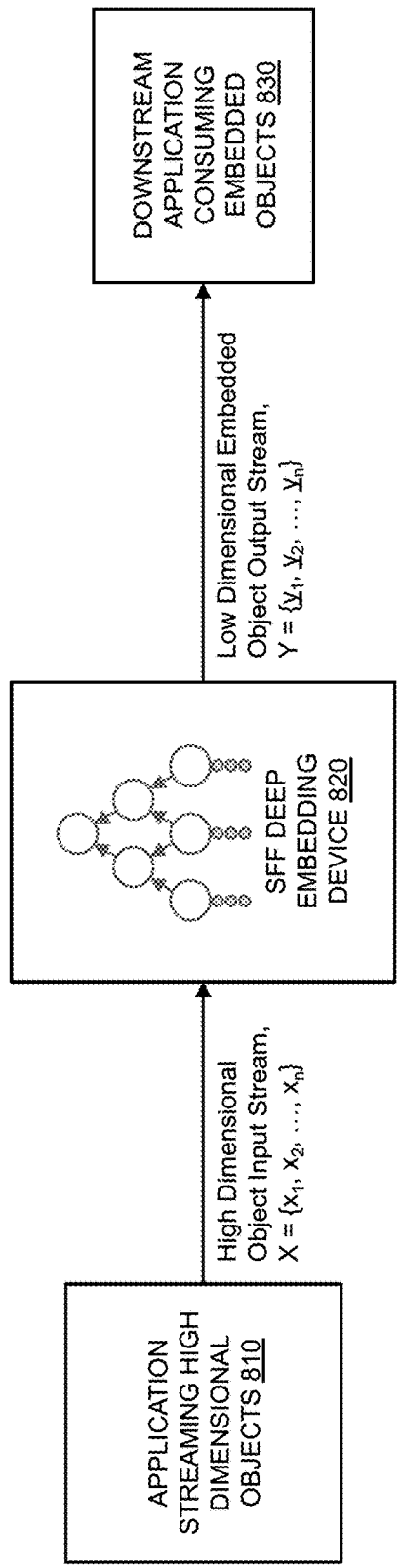
FIG. 8 – Deploy Deep Embedding Architecture.

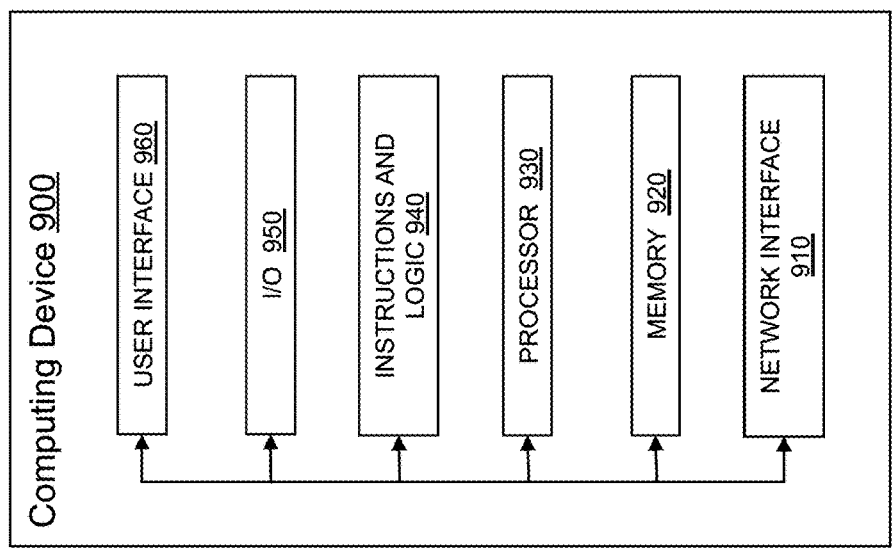

SYSTEMS AND METHODS FOR FAST AND REPEATABLE EMBEDDING OF HIGH-DIMENSIONAL DATA OBJECTS USING DEEP LEARNING WITH POWER EFFICIENT GPU AND FPGA-BASED PROCESSING PLATFORMS

CROSS-REFERENCE TO RELATED APPLICATIONS

This application claims priority under 35 U.S.C. § 119(e) to U.S. Provisional Patent Application No. 62/448,170, entitled "Systems and Methods for Fast and Repeatable Embedding of High-Dimensional Data Objects Using Deep Learning With Power Efficient GPU and FPGA-Based Processing Platforms," filed Jan. 19, 2017.

GOVERNMENT RIGHTS

This invention was made with government support under Contract No. FA8650-15-C-7552 awarded by the United States Air Force. The government has certain rights in the invention.

FIELD OF THE INVENTION

Embodiments of the present invention relate to systems and methods for improving the speed, repeatability, and utility of computing an embedding of high-dimensional data objects. More particularly, embodiments of the present invention relate to systems and methods for utilizing a deep learning neural network on a pipelined processing architecture to create an improved embedding function that exhibits deterministic behavior after being trained. In this context, the term "pipelined" may refer to an implementation of claimed methods on a graphics-processing unit ("GPU") or a field programmable gate array ("FPGA") module or a combination of both, and the FPGA hardware in some embodiments may serve as a coprocessor for the GPU-based module, or vice-versa. Still more particularly, embodiments of the present invention provide a method to convert an embedding of a collection of high dimensional data objects, arrived at through any means, into a decoupled computation. For example, the modular computation of an embedding of a collection of high dimensional data objects often includes computationally expensive, stochastic and/or non-parallelizable processes that may slowly, serially, and iteratively bring a force diagram including many high dimensional objects in the collection into equilibrium—where, in general, such a force diagram may couple every high dimensional object to every other high dimensional object so that every embedding is dependent on the joint embedding of all other objects in the collection. In an embodiment of the present invention, any such formal embedding is converted into a parallelizable deterministic embedding computation where the computation of an embedding of a single high dimensional object is decoupled from the computation of any other high dimensional object. The only input(s) to the resulting parallelized embedding function is (are) the high dimensional object(s) to be embedded. Even more particularly, embodiments of the present invention relate to systems and methods for using such deterministic embedding functions created with deep learning networks to: (1) improve the probability of automated high-dimensional object recognition; (2) enable translation of one type of object (such as an image, or other high dimensional object) into another type of object (such as another image or other high dimensional object); and (3) more quickly, scalably and efficiently compute more relevant relationships (for example, distances or similarities) between high-dimensional data objects (including the efficient computation of an aggregate metric or loss function computed in the embedded space, and the computation of derivatives of such an aggregate metric or loss function with respect to parameters of a deep learning network)—to be used as, for instance, input to another module that employs the embeddings or functions thereof for another purpose.

BACKGROUND

The general problem of analyzing images is difficult, in part because images are typically high dimensional objects. Each elemental component of an image, such as a pixel, may itself comprise several dimensions corresponding to various color and intensity values, for example. Thus, a typical rectangular RGB image having a resolution of, say, 1,000×1,000 pixels, may have a dimensionality numbering in the millions. This high dimensionality can lead to computationally expensive operations for many algorithms, especially machine learning algorithms. High dimensionality also complicates automated visualization or identification of object properties, such as similarity between two images of the same object. For example, the same object may have many different appearances, depending on a variety of factors. In addition, the same object may be viewed both with and without deformation, which changes its appearance in the high dimensional image space, but does not change the object's identity. Objects may be viewed from different acquisition geometries, including different translations, rotations, foci, angular ranges of fields of view, etc. Objects may be captured from different cameras whose properties alter the high dimensional representations of the objects within their fields of view. Differences between high dimensional images of an object may be due to object type, object property (such as color, size, etc.), object pose, object transformation, camera effect, or other difference. The complexity and interdependencies of relationships between an object and a high dimensional image of an object makes the computation of similarity metrics between images difficult. The definition of a general-purpose image similarity function is an unsolved problem in computer vision (Wang et al., 2014), and many simple metrics (for example, mean square error ("MSE"), or other pixel-based metrics, such as non-local means (Chaudhury, 2013)) to sophisticated metrics (for example, scale invariant feature transform descriptors, or "SIFT" descriptors (Lowe, 1999), or other descriptor-based metrics) have been proposed and used for many tasks in computing similarities between images. The performance of image similarity metrics is highly dependent on the type of image and the particular task, such as recognition of an object label. One of the ways to cope with high dimensionality in the computation of meaningful similarities between images is to embed a high dimensional data object into a lower dimensional space that still captures most of the objects' salient properties (i.e., its features and/or similarity properties) relevant to the application at hand (Norouzi et al., 2013). Such an embedding can be thought of as a summary of the high dimensional image that is invariant to common differences between images of the same object type, for instance.

Many dimensionality reduction and/or embedding algorithms exist today. For brevity we use the term "embedding" to refer to the result of any dimensionality reduction or embedding algorithm applied to an object or a plurality of objects. We also acknowledge that our discussions of the prior art can be found in Van der Maaten & Hinton, 2008.

Popular embedding algorithms include Principal Component Analysis ("PCA"), t-distributed Stochastic Neighbor Embedding ("t-SNE") (Van der Maaten & Hinton, 2008), Sammon mapping (De Ridder & Duin, 1997), locally linear embedding ("LLE") (Roweis & Saul, 2000), isometric feature mapping ("ISOMAP") (Bengio et al., 2004), and multidimensional scaling ("MDS") (Shepard, 1980). One of skill in the art will appreciate that there are many others and combinations of those listed. According to Van der Maaten & Hinton (Van der Maaten & Hinton, 2008), a large number of nonlinear dimensionality reduction techniques that aim to preserve the local structure of data have been proposed, many of which are reviewed by Lee and Verleysen (Lee & Verleysen, 2007). In particular, we mention the following taxonomy of embeddings broken into two groups. The first seven techniques are representative of formal embeddings and the eighth and ninth techniques are byproduct embeddings. This taxonomy of embedding is as follows: (1) Sammon mapping (De Ridder & Duin, 1997), (2) curvilinear components analysis ("CCA"; (Demartines & Hérault, 1997)), (3) Stochastic Neighbor Embedding ("SNE"; (G. E. Hinton & Roweis, 2002)), (4) ISOMAP (Bengio et al., 2004), (5) Maximum Variance Unfolding ("MVU"; (Weinberger & Saul, 2006)), (6) Locally Linear Embedding ("LLE"; (Roweis & Saul, 2000)), (7) Laplacian Eigenmaps (Belkin & Niyogi, 2007), (8) Autoencoders (G. E. Hinton & Salakhutdinov, 2006), and (9) intermediate hidden representations from a deep analyzer designed for some other purpose (such as object recognition features used for search (Krizhevsky, Sutskever, & Hinton, 2012), e.g.). Despite the strong performance of these techniques on artificial data sets and in some cases on real data, they are often not very successful at compactly embedding real, high-dimensional data in a way that is interpretable by a human being. In particular, most of the techniques are not capable of retaining both the local and the global structure of the data in a single embedding. For instance, a recent study reveals that even a semi-supervised variant of MVU is not capable of separating handwritten digits into their natural clusters (Song, Gretton, Borgwardt, & Smola, 2007).

In general, dimensionality reduction algorithms like the ones listed above operate on a collection of high dimensional data objects to create a much smaller-dimensioned manifold or topological space that preserves certain desired structural features of the objects. The embedding typically achieves an order of magnitude or more reduction in the dimensionality of the original objects, and often a typical dimensionality reduction in the embedding to between $\frac{1}{10}^{th}$ and $\frac{1}{100}^{th}$ of the original number of dimensions.

FIG. 1 illustrates a conceptual embedding of various image representations of the letter 'A' using a nonlinear dimensionality reduction algorithm. In FIG. 1, high dimensional objects 110 correspond to various representations of the letter 'A', which are tiled into a collection of 17*13=221 individually rotated and scaled images. The original collection of high dimensional objects 110 contains gray-scale images of the letter 'A' (e.g., items 111/113/115/117/119) that have been scaled and rotated by varying amounts. Every individual image of a letter 'A' in the collection 110 may comprise, for example, 64×64 gray-valued pixels corresponding to an object dimensionality of 64²=4096 dimensions per image. The vertical axis of the tiling shows 17 samples in increasing clockwise order of rotations from image tiles each with a −90 degree rotation in the top row 111-113 to a +90 degree rotation in the bottom row 115-119.

The horizontal axis of the tiling shows 13 samples in decreasing scale from column 111-115 to column 113-119. In this example of an embedding 120, the embedding algorithm has discarded the correlated information in the images (i.e., the letter 'A' itself) and has recovered only the information that varies across the images; that is, rotation and scale. The resulting two-dimensional plot 120 represents the embedded space illustrating the results of the embedding. The corresponding 2D embedded vectors 120 of the high dimensional objects 110 has a 1:1 correspondence, meaning that for every image in the collection of high dimensional objects 110, there is exactly one dot in the collection of 2D embedded vectors 120 (i.e., each 2D embedded vector is represented by a dot). For instance, the largest scale −90 degree rotated image of the letter 'A' 111 corresponds to a single dot 121 in the collection of 2D embedded vectors 120. Similarly, the smallest scale −90 degree rotated image of the letter A 113 corresponds to a different dot 123 in the collection of 2D embedded vectors 120. Similarly, the largest scale +90 degree rotated image of the letter 'A' 115 corresponds to a different dot 125 in the collection of 2D embedded vectors 120. Similarly, the smallest scale +90 degree rotated image of the letter 'A' 119 corresponds to a different dot 129 in the collection of 2D embedded vectors 120. As is often a desirable property of embeddings, the 2D embedded vectors 120 capture salient properties of the collection of high dimensional objects 110, grouping various scales, for instance in this embedding, into samples along a ray delimited by items 123 through 121 from a central location. In other words, each image (e.g., 111/113/115/117/119) and its corresponding embedding (121/123/125/127/129, respectively) together form pairs in their respective spaces. Every set of samples along an individual ray corresponds to a specific rotation. Note an individual image, say the largest scale, −90 rotated image of the letter 'A' 111 comprises many grayscale pixels, say on an M×M rectangular lattice, and is a high dimensional object of dimensionality M×M; its corresponding 2D embedding 121 is represented with only two dimensions, so the embedding effects a dimensionality reduction (and can be considered a kind of data compression).

FIG. 2 illustrates a real result of an embedding of various image representations of handwritten Arabic numerals written in a variety of ways. The high dimensional objects 210 are tiled into a collection of 20×20 (400) individual images of handwritten digits in the range zero to five. In this example, an embedding algorithm (t-SNE, (Van der Maaten & Hinton, 2008)) has converted affinities of the Arabic numerals 210 into probabilistic t-distributions, resulting in a clustering of the numerals into local groups 220, where each local group, say, the group for zero 225, for instance (often termed a cluster) corresponds roughly to a different numeral. The corresponding 2D embedded vectors 220 of these high dimensional objects 210 has a 1:1 correspondence, meaning that for every image in a tile in the collection of 400 high dimensional objects 210, there is exactly one representative copy of that object in the collection of 2D embedded vectors 220 (i.e., each 2D embedded vector is represented by the (x, y) location in 220 of a scaled version of the image from a particular tile in the tiling 210). For clarity, some copies of individual images corresponding to specific locations in the embedding 220 are drawn with a white background to illustrate where individual samples fall in the embedding 220. Note that in this embedding 220, the 2D embedded representations of more visually similar high dimensional objects are closer together in the embedding than visually dissimilar objects. Note, for instance, the cluster 225 of images of the numeral, zero. Distances between 2D embedded representations of zeros are generally smaller than distances between 2D embedded representations of zeros and other numerals (such as four, e.g.), for instance.

All embeddings produce pairs, where each single input object (e.g., a high dimensional object) is paired with one output object (e.g., a low dimensional embedded object). Many embeddings operate by minimizing an energy function of the input objects. During the formal embedding process, the overall value of the energy function is minimized as the high dimensional objects come to equilibrium with each other. One common energy function connects high dimensional objects to each other with a mathematical spring that exerts attraction and/or repulsion forces between the objects, depending on the weighted distance between them (for example). A corresponding low dimensional force may also be defined. A corresponding energy metric of the high dimensional to low dimensional representations may also be defined. Objects are permitted to move as if acted on by these forces, typically for a predefined period or until a steady state is reached. Through the process of embedding, the energy forces change as high and/or low dimensional objects move toward or away from other objects, lowering the overall energy of the embedding. The embedding process typically coevolves the high and/or low dimensional representations to equilibrium.

One problem with computing embeddings as well as the computed embeddings, themselves, is their final equilibrium state depends on each and every one of the high dimensional input objects because they all interact with each other during the embedding process. For this reason, slightly different collections of high dimensional objects may cause their low dimensional counterparts to come to equilibrium in a vastly/qualitatively different configuration. In other words, the embedding can be highly sensitive to the distribution/selection (i.e., the configuration) of high dimensional objects chosen to compute the embedding, and for this reason, the computed embeddings may be of different quality and the same embedding process generally finds different embeddings with new data. We call this the distribution/selection effect.

In some embedding computations, a putative stochastic initialization of low dimensional embedded objects is chosen as a starting point for the embedding process. As a result, the output of each embedding process can be a completely different embedding, even when the set of high dimensional input objects is exactly the same. Such a stochastic initialization effect may compound the distribution/selection effect described above and may cause many formal embeddings to be practically irreproducible in a metric sense, even if for visualization purposes, some qualitative global aspects of computed embeddings may reliably recur in nearly every embedding (such as the separation of certain clusters, or the closeness of other clusters, for instance).

In addition, most of the above-listed embedding algorithms suffer from a number of other restrictions. For example, PCA is fast, but it frequently does not produce intuitively useful embeddings because it restricts the embedding to linear projections of the high dimensional objects. Both t-SNE and MDS can produce expressive embeddings that can capture intuitive properties of the data, including nonlinear relationships between objects, but they can be prohibitively expensive to compute even on small datasets. With various conventions on rotations, PCA can be made to produce the same embedding every time it is provided with the same dataset, but t-SNE and MDS both produce a different embedding every time they are run, even when the source data has not changed. This is because t-SNE and MDS generally start from stochastic initializations of embedded object populations, as discussed above. Though the random seed governing the embedded initialization can be set to create reproducible t-SNE and MDS embeddings from a given collection of high dimensional input objects, this is generally not done because these embeddings can not be reused to repeatably and independently embed other new high dimensional objects of the same type without extensions to the algorithms, themselves.

To the inventor's knowledge, only embeddings from autoencoders and intermediate hidden representations from a deep analyzer, collectively called byproduct embeddings in the present invention, provide a subset of the benefits of deep embeddings described in the present invention, in that byproduct embeddings can simultaneously be (1) a learned function of a deep architecture operating on an input high dimensional object that does not depend on other inputs to compute an embedding; (2) deterministically repeatable after training the deep architecture; and (3) deployable on GPUs and/or FPGAs if the deep architecture can be parallelized. To the inventor's knowledge, byproduct embeddings have never been used to approximate another formal embedding for use as its own intermediate representation, or for other applications that exploit a separate formal embedding representation as described in the present invention. The specific reasons these byproduct embedding methods are not used this way is that other formal embedding methods have been designed for specific downstream application purposes better suited to the applications described herein (such as translation, reduction of required training data, or active learning-based approaches to labeling datasets to enable downstream supervised learning), and other formal embedding methods have computational efficiency advantages compared to, for instance, autoencoders.

Specifically as it relates to the design of the embedded space with formal embedding methods, while byproduct embeddings can technically be deep architectures, akin to those described for use in the deep embeddings described below, these byproduct embeddings are not used the same way other formal embedding methods are (for visualization, e.g.), partly because byproduct embeddings are a feature learning side effect of the training procedure for the deep architecture (which may require far more dimensions than those that can be visualized, for example), rather than an embedding specifically designed for purposes that many of the other formal embedding methods described above have advantages in, such as for visualization (such as t-SNE) or computationally efficient dimensionality reduction (such as PCA). These drawbacks of byproduct embeddings from deep architectures teach away from techniques such as autoencoders and toward other formal embedding methods depending on the purpose of the embedding. Specifically, the unavoidable tradeoffs between human interpretability, generalizability of the embedded representation, and speed of computation in existing available formal embedding methods in the art have taught away from their fusion (as described in the present invention), and toward a choice of a formal embedding more suited to a particular application rather than to design a modular system that allows a design of the embedded space with a formal embedding method designed for a specific purpose (such as t-SNE for visualization, for example) to be encapsulated in a separate deep architecture that is separately optimized and separately deployed. While the development of "parametric t-SNE" (Van der Maaten, 2009) is one attempt to fuse the properties of formal embeddings designed for a specific purpose, it is neither modular (it only computes t-SNE embeddings) nor as computationally efficient to train as the deep embedding method described in the present invention (because parametric t-SNE uses Gibbs sampling and teaches away from backpropagation to optimize the deep architecture that effects the embedding).

While autoencoders (a type of byproduct embedding) can embed high dimensional object inputs, autoencoders in image analysis are generally used to reconstruct data rather than as an intermediate representation for other purposes, at least partially due to computational disadvantages of autoencoders. Specifically, using autoencoders for embedded representations compared to a formal embedding with t-SNE is taught away from in the art: "t-SNE provides computational advantages over autoencoders. An autoencoder consists of an encoder part and a decoder part, whereas parametric t-SNE only employs an encoder network. As a result, errors have to be back-propagated through half the number of layers in parametric t-SNE (compared to autoencoders), which gives it a computational advantage over autoencoders (even though the computation of the errors is somewhat more expensive in parametric t-SNE)" (Van der Maaten, 2009).

To the inventors' knowledge, none of the other commonly known formal embedding algorithms constitute a true deterministic function (in the mathematical sense) for adding new objects (sometimes called "out of sample objects") to an embedding after an initial formal embedding algorithm (such as from the above-listed) has been executed. That is, none of the commonly known formal embedding algorithms define a relation between a set of inputs and a set of outputs with the property that each input is independently related to exactly one output. This means that in general, new objects cannot be added or deleted from a formal embedding after it has been created without changing the embedding. Any time a new object is added or removed, either a new embedding must be created from scratch, or the embedding process must be restarted from a former state, as the introduction of new objects unpredictably perturbs pre-existing objects in an embedding.

To mitigate the perturbations of all low dimensional embedded objects from the addition and/or removal of one or more high dimensional input objects to be embedded, one could initialize embedding forces from an existing embedding. Forces could be added for all added objects and removed for all removed objects. The embedding process could then be forward-propagated a few time steps from where it was stopped with the new population. But the key concerns of modifying existing embedding algorithms (whether the algorithm is completely restarted or only perturbed from a former state near equilibrium) is that both options are computationally expensive and both employ forces that act on all objects simultaneously, so all embedded objects move around a little bit, even if only one new high dimensional object is added. In the case of a completely new embedding, in general, a stochastic re-initialization and sensitivity to the distribution (i.e., the collection of high dimensional objects to embed) make all new low dimensional embedded objects behave differently from previously embedded objects, thereby making measurements of similarity in the low dimensional embedded space problematic or impossible due to the changing dependence on other objects.

These limitations to existing embedding algorithms complicate trend analyses, limit usefulness, and tie each formal embedding to a specific population used to discover the embedding in the first place.

As an example of a popular formal embedding that illustrates many of the practical difficulties of formal embeddings described above, Van der Maaten & Hinton (Van der Maaten & Hinton, 2008) explains that the process of Stochastic Neighbor Embedding ("SNE") starts by converting high-dimensional Euclidean distances (with optional weightings) between high dimensional objects into conditional probabilities that represent similarities between the high dimensional objects. SNE can also be applied to data sets that consist of pairwise similarities between high dimensional objects rather than a collection of high-dimensional vector representations, themselves. This pairwise similarity approach is akin to interpreting these similarities as conditional probabilities. For example, human word association data consists of the probability of producing each possible word in response to a given word, as a result of which, human word association data is already in the form required to apply the SNE process. The similarity of high dimensional object, $x_j$, to high dimensional object, $x_i$, is the conditional probability, $p(j|i)$, that $x_i$ would pick $x_j$ as its neighbor if neighbors were picked in proportion to their probability density under a Gaussian distribution centered at high dimensional object, $x_i$. The self terms, $p(i|i)$, are set to zero, leaving only the pairwise similarities nonzero. For nearby high dimensional object pairs, $x_i$ and $x_j$, $p(j|i)$ is relatively high, whereas for widely separated high dimensional objects, $p(j|i)$ will be almost zero (for reasonable values of the variance of the Gaussian, $s_i$). The standard deviation, $s_i$, for every object, $x_i$, is computed by searching for the value of $s_i$ that yields an approximately fixed perplexity, where perplexity is $2^{H(P_i)}$ and $H(P_i)$ is the Shannon entropy (in bits) of the induced distribution over all high dimensional objects, or $$H(P_i) = -\sum_j p(j|i)\log_2 p(j|i).$$

The corresponding low dimensional embedded vectors corresponding to high dimensional objects $x_i$ and $x_j$ are $y_i$ and $y_j$, respectively. That is, there is a one-to-one mapping (correspondence) between high dimensional objects (each $x_i$) and low dimensional embedded vectors (each $y_i$). The similarity between each $y_i$ and $y_j$ is computed as if all y's were distributed Gaussian with a constant variance in the low dimensional space. The embedded vector counterparts of the $p(i|j)$ and $p(j|i)$ distributions are the $q(i|j)$ and $q(j|i)$ distributions, and self terms, $q(i|i)$, are also set to zero as for $p(i|i)$. In the case of a perfect embedding, $p(j|i)$ will equal $q(j|i)$, but in general, these distributions will diverge. SNE discovers the embedding by moving the y's to minimize that divergence between $p(i|j)$ and $q(i|j)$. Specifically, in SNE, the divergence, known as the Kullback-Leibler divergence, is defined as follows:

Kullback-Leibler divergence =

$$\sum_i KL(P_i \| Q_i) = \sum_i \sum_{j \neq i} p(j|i)\log\left(\frac{p(j|i)}{q(j|i)}\right).$$

All embedded vectors, $y_i$ are initialized as a random sample from an isotropic Gaussian in the low dimensional embedding space. That is, this is a stochastic initialization of all $y_i$. The SNE process iteratively reduces the Kullback- Leibler divergence between p(j|i) and q(j|i) using gradient descent. Specifically, the derivative of the cost function of the Kullback-Leibler divergence of the p(j|i) and q(j|i) distributions with respect to $y_i$ is computed in closed form. Every embedded vector, $y_i$, is moved in the direction of the negative gradient scaled by the gradient descent step size. In some cases, a momentum term is included in the computation of the gradient that adds the current gradient to a sum of exponentially decaying past gradients.

The iterative minimization of the Kullback-Leibler divergence via gradient descent is difficult for a number of reasons, and these all teach away from using similar approaches at scale or in cases where a repeatable metric is required.

First, the computation of all probability densities and computations can be expensive for large numbers of high dimensional objects. For instance, for a modern computer running SNE on a CPU, it is not uncommon for SNE to require multiple hours to converge to an embedding, depending on the dimensionality and intrinsic dimensionality of the x's, the parameters chosen for the embedding (like step size, momentum, magnitude of random perturbations of $y_i$'s during the embedding process, a momentum reduction schedule, etc.). Further, because of the difficulties described below, it is not uncommon to run the embedding process multiple times to discover parameters and/or embeddings that produce the best result. The stochastic, computationally intensive, and time intensive runs, iteratively searching jointly for optimization parameters and embedding results, frustrate the practical use of these embeddings for applications that require a repeatable and/or computationally efficient method of embedding a new high dimensional object independently of those use to discover an embedding. To the inventor's knowledge, no application uses such a formal embedding in this way.

Second, the random initialization can have the unintended effect of causing some computed $y_i$ embedded distributions to be intrinsically higher energy than others, and lower energy embeddings are generally preferable. To cope with this issue associated with some random initializations, Van der Maaten and Hinton (Van der Maaten & Hinton, 2008) suggest at least two solutions. The first solution is to run SNE multiple times and select the solution with the lowest Kullback-Leibler divergence as the embedding. A second solution (that can be implemented optionally with or without the first), is to add a small amount of noise to every embedded low dimensional vector at the end of every early iteration of the gradient descent at the same time that a momentum term is gradually reduced (akin to annealing methods). These last two workarounds both have the effect of making it less likely that the iterative SNE procedure will become trapped in local minima. While these workarounds may help SNE overcome local minima, these workarounds both exacerbate the unpredictability of the final embeddings due to both the random initializations and the random noise added to embedding vector locations during the SNE computation process. Thus, with the injection of noise to overcome local minima, even close embedding initializations may converge to very different final embeddings—i.e., the embedding process can be highly sensitive to initial conditions and to additional stochastic noise injected in the embedding process to make it more likely to find a lower energy equilibrium embedding.

Third, there is a phenomenon called the "crowding problem" in embeddings, where the intrinsic dimensionality of the distribution of high dimensional objects is larger than the dimensionality of the embedding space. Specifically, as Van der Maaten and Hinton (Van der Maaten & Hinton, 2008) explain, the low dimensional volume of the embedding that is available to accommodate moderately distant high dimensional objects will not be large enough compared with the low dimensional volume available to accommodate very close high dimensional points. Therefore, in order to properly embed small distances, most of the high dimensional objects that are at a moderate distance from a specific high dimensional object will have to be placed much too far away in the low-dimensional embedding. This crowding problem is not specific to SNE, but also occurs in other local techniques, such as t-SNE, Sammon mapping and locally linear embedding ("LLE") and other formal embeddings.

Fourth, since all embedded objects depend on all other embedded objects, the addition of even one more high dimensional object into the SNE process will perturb all other points, sometimes by large amounts that produce qualitatively different embedding results. In general, embeddings are implicitly defined, and are not functions, per se, that take each high dimensional object as input and quickly compute its low dimensional embedding. While it is theoretically possible to add one or more individual high dimensional objects to the SNE process, in practice, it is not done due to the compounding of difficulties described above, and the sensitivity of all embedded objects to the addition or removal of high dimensional objects. Specifically, embedding new high dimensional objects rearranges originally or previously embedded high dimensional objects, so if a downstream application were to depend on computations based on originally and/or previously embedded objects in a downstream application, those would need to be updated whenever new embedded objects are computed, or whenever embeddings change more than a tolerance, for instance.

SNE is only one example of an iterative embedding that suffers population distribution sensitivity, optimization, crowding, computational and addition/removal sensitivity issues. Similar difficulties arise in more recent and related embedding techniques, such as t-SNE (Van der Maaten & Hinton, 2008), Barnes-Hut-SNE (Van Der Maaten, 2013), UNI-SNE (Cook, Sutskever, Mnih, & Hinton, 2007), tree-based t-SNE (Van Der Maaten, 2014), and parametric t-SNE (Van der Maaten, 2009).

While t-SNE ameliorates the crowding problem by allowing distant high dimensional objects to effectively decouple, it does not eliminate the crowding problem. While parametric t-SNE provides a number of approaches to addressing the crowding problem, Van der Maaten (Van der Maaten, 2009) recommends learning the parameter defining the degrees of freedom. This learning of the degrees of freedom exacerbates the practical computational difficulties in both finding and using embeddings.

The emergence of small form factor, power efficient graphics processing units ("GPUs") has lead to the deployment of these devices for new applications (on drones and mobile devices, etc.). The example embedding process described above is iterative (i.e., serial) and most commonly has different requirements in memory and computational parallelizability than GPU hardware is typically designed to compute. Therefore, even if it were possible to incrementally update the embedding with one or more additional high dimensional objects, to do so efficiently would require a different runtime profile and hardware configuration than the use case where the system only has access to a preloaded deep architecture running on a power efficient GPU. Deployed applications may require the computation of an embedding for new high dimensional objects faster than the embedding process can compute them (requiring, for instance, the computation of hundreds of high dimensional object embeddings per second), such that existing formal embedding methods can not keep up with the use case (if it requires speed and repeatability, e.g.). This mismatch between computational infrastructure and performance requirements for formal embeddings and the deployed system embodiment of deep learning algorithms has impeded the incorporation of formal embedding methods into deep learning applications, especially applications that may not have the time, memory, or hardware to compute an embedding within the duty cycle of the application (where duty cycle is, for instance, computing a similarity of two high dimensional image objects at a relatively high frame rate—say 30 frames per second).

Before the expressivity of deep learning methods was recognized by the community, multiple groups attempted to learn a modular embedding function with eigenfunctions (Bengio et al., 2004) and/or eigenmaps (Belkin & Niyogi, 2007). However, both (1) the poor fidelity and (2) poor computational performance of eigenfunctions and eigenmaps in approximating embeddings have taught away from this approach of modularizing the approximation of an embedding with a function.

Due to the difficulties of both approximating and computing an embedding as a separate module (as a deep architecture, for instance), in Van der Maaten (Van der Maaten, 2009), an approach was outlined that would couple the two processes to learn a specific t-SNE embedding function directly as a deep architecture. In this case, the deep architecture computed the embedding, itself, by minimizing a t-SNE embedding loss directly with a deep architecture. In this way, the parametric t-SNE approach (Van der Maaten, 2009) is coupled directly to the process of embedding and not modularized from it—therefore there is no approximation error when applying the embedding to new points that were not used to compute the embedding, itself, and the deep architecture enjoys the computational advantages of being deployable on a GPU. One key drawback to the parametric t-SNE approach (Van der Maaten, 2009) is that when learning a new embedding, the deep architecture's loss function, itself, must be explicitly reformulated to effect different embeddings than the loss function for the t-SNE embedding. The parametric t-SNE approach approximated t-SNE (Van der Maaten, 2009), but it is not clear how to, or even if it is possible, to extend such a parametric t-SNE approach generally to approximate other embeddings, such as LLE, ISOMAP, MDS, or MVU, or those listed in the taxonomy of formal embeddings, e.g. These coupling and approximation considerations have taught away from the concept of modularizing the embedding process from the deep architecture. Decoupling the design of the embedding from its deployed embodiment, both computationally and in the hardware required to execute the deep embedding, are foci of the present invention.

The parametric t-SNE approach (Van der Maaten, 2009) is separated into three distinct stages, proceeding through (1) pretraining (2) construction and (3) finetuning stages. The three stage process begins with a computationally expensive Gibbs sampling-based optimization process which diverges radically from modern approaches to train deep architectures with backpropagation. Specifically, the pretraining stage of the parametric t-SNE approach teaches away from backpropagation-based techniques proposed for the present invention of deep embedding, writing: "the three-stage training procedure aims to circumvent the problems of backpropagation procedures that are typically used to train neural networks." Other arguments also teach away from dropping the pretraining stage in parametric t-SNE, including "preliminary experiments revealed that training parametric t-SNE networks without the pretraining stage leads to an inferior performance" (Van der Maaten, 2009). The Restricted Boltzmann Machines ("RBMs") in the pretraining stage are composed of Bernoulli and Gaussian distributed hidden units, and also teach away from the newer more effective unit types (such as rectified linear units) and their corresponding initializations (Glorot & Bengio, 2010) and normalization techniques (Ioffe & Szegedy, 2015). The argument for a sampling-based pretraining step, in general, teaches away from improved optimization properties that address many of the problems of backpropagation (Van der Maaten, 2009), but that have been incorporated into some embodiments of the present invention.

Since 2012, it has been discovered that deep architectures, after supervised training, can effect, as a byproduct of training, an implicit embedding, themselves, (called byproduct embeddings in the taxonomy above) and that this representation can be used directly for other applications. In machine translation applications in 2013, for example, a formal PCA embedding of the high dimensional objects (words) using a word2vec embedded space, discovered in some cases by a deep architecture, has been shown to be conserved across different languages, and can improve machine translation results of words and phrases (Mikolov, Le, & Sutskever, 2013). In none of these cases was a deep embedding method as described in the present invention used in these language translation methods. The same use of a formal embedding method to discover a space that would allow translation of other high dimensional objects (such as images) has not been shown, but is a focal application the present invention enables.

SUMMARY OF THE INVENTION

Deep learning is a branch of machine learning that attempts to model high-level abstractions of data (e.g., objects) by transforming raw data (e.g., an image) into successive layers of abstractions using non-linear transformations between each layer. Various deep learning architectures such as deep neural networks, deep convolutional neural networks, recurrent neural networks, and deep belief networks have been investigated and found to be useful in fields like computer vision, automatic speech recognition, natural language processing, audio recognition, and bioinformatics. Some deep learning architectures have been inspired by advances in neuroscience and are loosely based on interpretations of information processing and communication patterns in a nervous system, such as neural coding, which attempts to define a relationship between a stimulus and subsequent neuronal responses observed among affected neurons. Many variations of deep learning techniques are known in the art.

Embodiments of the present invention are directed to providing new systems and methods for using deep learning techniques to generate embeddings for high dimensional data objects that can both simulate the prior embedding algorithms and also provide superior performance compared to the prior methods.

Deep learning techniques used by embodiments of the present invention to embed high dimensional data objects may comprise the following steps: (1) generating an initial formal embedding of selected high-dimensional data objects using any of the traditional formal embedding techniques (e.g., PCA, t-SNE, MDS, etc.); (2a) designing a deep embedding architecture, which includes choosing the types and numbers of inputs and outputs, types and number of layers, types of units/nonlinearities, and types of pooling, for example, among other design choices, typically in a convolutional neural network; (2b) designing a training strategy (i.e., tuning optimization algorithm hyper-parameters, including learning rate, momentum, dropout rate by layer, etc.), (2c) tuning the parameters of a deep embedding architecture to reproduce, as reliably as possible, the generated embedding for each training sample (i.e., training the deep embedding architecture); (3) optionally deploying the trained deep embedding architecture to convert new high dimensional data objects into approximately the same embedded space as found in step (1); and optionally (4) feeding the computed embeddings of high dimensional objects to an application in a deployed embodiment.

Performance improvements achieved by embodiments of the present invention may include: (1) speed of computation of an embedding of one or more high dimensional objects; (2) computation of an embedding of one or more high dimensional objects with power efficient hardware and software that vastly reduces time and power requirements; (3) the ability to add a single high dimensional object to an embedding without perturbing the distribution of original and/or previously computed embedded objects; and (4) the use of embeddings as data representations that improve the performance of other downstream tasks/applications that may use the deep embedding for some other use case/application (e.g., machine translation and/or reducing the total amount of training data to achieve a desired machine learning module performance).

The performance improvements occur because the execution of a deep embedding architecture can often be orders of magnitude faster for many use cases (hours to compute using traditional formal embedding techniques, compared to fractions of a second for a computation of a deep embedding for one or more high dimensional objects as described by the present invention). Deep embeddings can be computed in parallel on low cost, power efficient GPU hardware (NVIDIA desktop GPUs and NVIDIA Tegra GPUs, e.g.), FPGA hardware, or custom ASICs.

Another benefit of the present invention is that deep embeddings are deterministic after discovery. That is, once a deep embedding has been learned, the embedding function is static and will always generate the same low dimensional embedding for each given high dimensional object. This allows deep embeddings to be used in ways that traditional formal embeddings (with stochastic and/or high sensitivity elements) can not. For instance, once an embedding definition exists, it can be used for other tasks as an intermediate step in computing a metric (or loss function) in a way that a formal embedding that would change cannot be used.

Still another benefit of the present invention is that deep embeddings can separate a formal embedding process from both learning an approximation of that embedding (i.e., training the deep embedding architecture) and from a deployed use case of the approximate deep embedding function. When deploying a module to compute a deep embedding, the module does not require hardware to carry out the operations to compute (and/or recompute any part of) the original embedding process (i.e., the formal embedding), only the reduced set of operations in the deep embedding architecture that compute an approximation to the formal embedding are required.

Finally, deep embeddings can embed new high dimensional objects not used to compute the original embedding without perturbing the relative locations of original or previously computed embeddings of high dimensional objects. This also follows from the static nature of embedding algorithms.

Improving Training Data

In many machine-learning applications, it is the availability of large amounts of high quality training data for supervised learning that improves performance on a given task, such as object recognition (Krizhevsky et al., 2012). For instance, in supervised machine learning problems, more labeled training examples typically coincide with better performance. In many cases, historically, the collection of labeled training data has been manual. In the case of the curation of large object recognition training corpora, for instance, individual human labelers may spend massive resources (in time and money) to label a large-enough dataset to enable supervised machine learning techniques to achieve a particular performance requirement ("LabelMe. The Open annotation tool," n.d.). Amazon Mechanical Turk ("AMT") is one high volume labeling approach that crowd-sources the labeling of such data to a distributed population and individuals are paid a nominal fee, effectively at a nominal rate per label produced ("Amazon Mechanical Turk—Welcome," n.d.). In some cases, because humans may disagree on labels, to ensure the accuracy of labels provided by people, a downstream consensus check is incorporated that requires multiple labelers to agree on a particular label before adding it to a corpus, further increasing costs. The typical naïve sequential labeling of independent images (i.e., providing a GUI for a human to assign a label to an image one random image at a time) does not exploit image similarities to improve the efficiency of labeling. While small populations of images could be presented to a human for verification, such a verification step still typically requires the human to visually inspect every image, for instance, and it can complicate interface design and slow down the process and/or increase the labeling error rate. A dimensionality reduction/embedding technique like the one in FIG. 2, can be leveraged to label an individual cluster based on viewing only one (or a few) images from that cluster. Such an approach can greatly reduce the number of labeled examples a human is required to view because other previously unlabeled elements in a tight cluster in an embedded space can inherit the label of one or more close proximity labeled objects in the embedded space.

The Prior Art Teaches Away from Using Photo-Realistic Models to Improve Quantity and Quality of Available Image Sensor Data Sparse (often high cost) labeled image data from an operational imaging sensor is often available for supervised learning of a task (say, object recognition). Sparse, in this context, means that there is, in general, insufficient quantity of labeled training image data to achieve a specific, desired high performance metric requirement with a supervised machine learning algorithm known in the art, but if more labeled image data were available for training, the supervised machine learning algorithm could achieve the desired performance. To increase the quantity of training data available, one approach is to augment existing image sensor data with data rendered from a model. In this case, a model may be a computer-assisted design ("CAD") model, and rendering refers to a computer algorithm that approximately reproduces synthetic images with very close visual similarity to real sensor images by simulating the known phenomenology of the sensor. In virtual reality, for instance, CAD models of people and vehicles are often rendered very closely to photo-realistically. However, many papers teach away from using model data in place of real image sensor data due to many of the difficulties with image analysis discussed above (Sun & Saenko, 2014). This is because, in general, deep architectures known in the art can distinguish synthetic model data from real data acquired from an operational imaging sensor. In the case of human visual perception, this difference between even high quality model data and real operational imaging sensor data is sometimes termed "the uncanny valley" (Uncanny valley, 2016).

The above summaries of embodiments of the present invention have been provided to introduce certain concepts that are further described below in the Detailed Description. The summarized embodiments are not necessarily representative of the claimed subject matter, nor do they limit or span the scope of features described in more detail below. They simply serve as an introduction to the subject matter of the various inventions.

BRIEF DESCRIPTION OF THE DRAWINGS

So the manner in which the above recited summary features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 illustrates a conceptual embedding of various image representations of the letter 'A' using a nonlinear dimensionality reduction algorithm.

FIG. 2 illustrates a real result of an embedding of various image representations of handwritten numeric digits.

FIG. 3 illustrates an exemplary embodiment of a method and system for deep embedding and its deployment, in accordance with the present invention.

FIG. 4 illustrates an exemplary embodiment of an optional pre-processing module as first illustrated in FIG. 3.

FIGS. 5 (5*a* and 5*b*) illustrates an exemplary embodiment of the modules of Step One, the formal embedding module shown in FIG. 3.

FIG. 6 illustrates an exemplary embodiment of the modules of Step Two, the learning of a deep embedding architecture module in FIG. 3.

FIG. 7 illustrates an exemplary embodiment of the modules of Step Three, the export of a deep embedding architecture module in FIG. 3.

FIG. 8 illustrates an exemplary embodiment of the modules of "Step Four, the deployment of a deep embedding device module in an application in FIG. 3.

FIG. 9 is a block diagram of an exemplary embodiment of a computing device 900, comprising a plurality of components, in accordance with the present invention.

DESCRIPTION OF THE EMBODIMENTS

Embodiments of the present invention will be described with reference to the accompanying drawings, wherein like parts are designated by like reference numerals throughout, and wherein the leftmost digit of each reference number refers to the drawing number of the figure in which the referenced part first appears.
Overview FIG. 3 illustrates an exemplary embodiment of a method and system for deep embedding and its deployment, in accordance with the present invention.

The method comprises five stages, including optional pre-processing 310, embedding 320, learning of a deep embedding architecture 330, the export of a deep embedding 340, and the deployment of deep embedding into an application/use case 350. The first stage, preprocessing 310, is optional, and is only performed if desired.
Preprocessing Raw High Dimensional Objects FIG. 4 illustrates an exemplary embodiment of an optional pre-processing module as first illustrated in stage 310 of FIG. 3. As an introduction, we imagine a scenario in which the activations of a layer in a neural network 445 are to be used as processed input 450 to another downstream module. We call the network that produces these activations a deep analyzer network 440. This activation layer of the deep analyzer 445 may have hundreds or even thousands of outputs (i.e., it is, itself, a high dimensional object derived from one of the high dimensional input objects 410), and in one embodiment of our invention, this high dimensional object 445 is embedded into two dimensions in order to be visualized as an understandable scatter plot, in some cases to find patterns in the properties of the high dimensional objects.

In one embodiment of the invention, a preprocessing module 310 may preprocess raw high dimensional objects 410 into processed high dimensional objects 450 by imparting the deep analyzer network's 440 own dimensionality reduction or embedding properties to the raw high dimensional objects 410 before they are presented to a formal embedding step 320 (i.e., Step One) in the overall system. In one such embodiment, a deep architecture having many hidden layers (called a deep analyzer 317/440 in contradistinction to the deep embedding architecture 337/620 envisioned for learning a formal embedding 325) is trained for a particular task (object recognition, generative image modeling, or image translation, for instance). For natural language applications, the task of deep analyzer network 440 may be to recognize words in a speech audio file, recognize objects in image files, translate speech, or generate images with some desirable properties, or any other purpose known in the art. Typically, during training 430, the hidden layers of the deep analyzer 445 learn to represent increasingly abstract concepts in the raw high dimensional objects 410 (e.g., concepts such as images, speech, or sentences).

It is common practice in machine learning and deep learning to reuse some abstract representation of input data for another task. In one embodiment of the present invention, the formal embedding step 320 (i.e., Step One) may take raw high dimensional objects 410 (such as images) as input 323 directly or might first process them with a deep analyzer 440 for some other task, and use activations from a hidden layer of the deep analyzer 445 as processed high dimensional object inputs 323 to the formal embedding process 320 described in Step One. This processing of raw high dimensional objects 410 may be repeated through one or more deep analyzers 440. For instance, a first preprocessing step's deep analyzer 440 may produce an intermediate byproduct embedding 445 of high dimensional input objects 410, and those byproduct embeddings 445 are reused as input 410 (and optionally its labels 420) to a train 430 a subsequent preprocessing step's deep analyzer 440. In this way, multiple preprocessing steps can be performed in sequence.

In an embodiment, the byproduct embedding 445 may be the result of training a deep analyzer 430 in the optional pre-processing stage 310 for some task that may be related to the ultimate upstream 353 and/or downstream application 357. In one embodiment, where labeled categories 420/311 of high dimensional objects 410/311 are available, training 430 a deep analyzer 440 may comprise supervised learning of object categories with a convolutional neural network, for instance, of which many are known in the art (i.e., deep learning techniques for object recognition). The deep analyzer network 440, operating on each of the high dimensional objects 410, is computed, and an internal, intermediate set of activations 445 proximate to the final result of the deep analyzer 440 (i.e., the activations of a hidden layer 445 of deep analyzer 440) is chosen and taken to be the byproduct embedding 445. In another embodiment, where only the unlabeled collection of high dimensional input objects 410 are available (or desirable for training), training a deep analyzer 430 may comprise unsupervised learning of a reconstruction function, such as a deep convolutional autoencoder, for example. In this embodiment, the byproduct embedding 445 may be taken as a hidden layer corresponding to a lower dimensional representation (i.e., the bottleneck of an autoencoder, for instance).

In the sections and paragraphs below, the raw high dimensional objects 410 or their ultimately pre-processed high dimensional objects 450 are referred to as training data 323 to the Step One formal embedding process 320. Note that beyond the benefit of simply preprocessing the high dimensional objects, the deep analyzer 430 or a faithful approximation of it as a different deep analyzer (for example, through an optimization/compilation step 343 such as distillation (G. Hinton, Vinyals, & Dean, 2015) and/or pruning (Iandola et al., 2016)) can execute on the same SFF hardware 348 as the deploy mode hardware 355 used in the application 350. This is in contradistinction to most of the described formal embedding methods, which are often serial and dependent on other objects, and typically computed on CPUs.

In accordance with the discussion above, the system's software switch 319 (of FIG. 3) is configured to use for input 323 to the formal embedding method 325 either the raw high dimensional objects 311/410 or the byproduct embedding 315/445 of those objects. As discussed above, such a byproduct embedding 315/445 may improve the overall functioning of the deep embedding system, but it is often not necessary for the function of a deep embedding system.

Step One: Generate a Formal Embedding

FIGS. 5 (5a and 5b) illustrates an exemplary embodiment of the modules of Step One, the formal embedding module 320 shown in FIG. 3. Our first step 320 in the process of creating a deep embedding is to generate a formal low dimensional embedding (notionally, sometimes referred to as 2D embedding, for illustration purposes only—actual embeddings may be higher dimensional) of the input training data 323/510. Regardless of which form of high dimensional objects are used as input 323 to the formal embedding process 325/520 in Step One, we typically refer to that data as training data 323/510, denoted by $x_i$. In Step One 320, we generate a formal embedding by passing the training data 510 through a known embedding algorithm 520. In one embodiment of the present invention, the embedding algorithm 520 can be a dimensionality reduction and visualization algorithm such as t-SNE, which generates a low dimensional embedding 530 from the training data 510. The compute formal embedding method computes a single low dimensional embedded object, $y_i$, one of a plurality of the same object type in the collection of low dimensional embedded data 530, corresponding to each individual high dimensional input object, $x_i$ (in the high dimensional input data 510). In one embodiment, that low dimensional embedding data becomes a new set of target locations 530 paired 540 with the original high dimensional object training data 510. In other words, each high dimensional object in the training data 510/323 is paired with a low dimensional target location 530/327 created by the embedding algorithm 520/325.

In another embodiment, the embedding method in the compute formal embedding module 520 is one of the other formal embedding methods listed in the taxonomy. In yet another embodiment of the invention, the embedding method in the compute formal embedding module 520 is a pairing of every high dimensional object with a lower dimensional representation by a human analyst via a human computer interface, such as a graphical user interface and a touch screen, drawing pad and stylus, and/or mouse input device. As described above in the background section covering the taxonomy of formal embedding methods, we noted that there are advantages and disadvantages to each of the existing embedding algorithms known in the art, trading, for instance, accuracy versus explainability, simplicity versus complexity (in the number of optimization parameters and their interaction, for instance), linearity versus expressivity, fidelity to local embedded structure versus fidelity to global embedded structure, the ability to overcome local minima versus increased stochasticity, etc. In an embodiment, the choice of a specific formal embedding algorithm 520 can be modularized from the deployed method of computing the embedding for new objects 355, allowing systems to be designed and tested on a module-per-module basis (310/320/330/340/350), rather than designed and tested as modules that may have unpredictable dependencies with each other (as with parametric t-SNE), or force unwanted design tradeoffs. In an embodiment, the present invention does not even need to know what embedding process 520 produced the embedded vectors 530 from the high dimensional objects 510—the embedding could even be computed by hand by people using a process like Amazon Mechanical Turk (by crowdsourcing the embedding). The only requirement of the formal embedding process 520 is that it output the pairs 550 of training data high dimensional objects 510 and target locations 530 that can be used to train a deep architecture to approximate the embedding 330. In an embodiment, the embedding requires only the output pairs of the embedding 550, and no knowledge of the formal embedding process 520, itself.

In all embodiments, the results of the compute formal embedding module are corresponding $x_i$ 510 and $y_i$ 530, which are subsequently paired 540 into pairs: $(x_i, y_i)$ 333/550, which are the inputs to the subsequent stage, learn deep embedding architecture 330.

Step Two: Train a Neural Network to Approximate the Embedding Function

FIG. 6 illustrates an exemplary embodiment of the modules of Step Two, the learning of a deep embedding architecture module 330. In one embodiment, this paired data 333/550/610 is then used to train 620 a new neural network (we call this deep architecture a deep embedding architecture 630—in contradistinction to the deep analyzer network 317/440 that may produce the preprocessed byproduct embeddings 315/445 in some embodiments). The trained neural network for the Deep Embedding 630 can then take in new input high dimensional data samples appropriately preprocessed (such as the preprocessing that produced $x_i$, to produce the training data objects for the formal embedding 323/510) and insert them into an embedding 530 quickly and without perturbing the data that has already been embedded 530. This is because the deep embedding is a learned 620 function 630 that embeds high dimensional objects ($x_i$) into lower dimensional objects ($y_i$) quickly, reproducibly, and independent of any other high dimensional or embedded object 510/530.

In one embodiment, the learn deep embedding architecture stage 330 is comprised of a train deep embedding architecture module 335/620 that, in an embodiment, effects a supervised learning of input and embedded object pairs 333/610 such that the learned deep embedding architecture 630 optimizes a loss function (L in FIG. 6) between the pairs computed by the formal embedding, ($x_i,y_i$) 610 and the pairs computed by the deep embedding architecture, ($x_i,y_i$)) 630. In an embodiment, the dimensionality of the low dimensional embedding 327/530 (i.e., Dim($y_i$)), is constrained to 2 or 3 to enable straightforward visualization on a computer monitor. In a more specific embodiment, an architecture 630 is a convolutional neural network selected from a list of predefined deep embedding architectures that includes a plurality of hidden layers comprised of layers with a combination of different or similar nonlinearities, as are known in the art, including rectified linear units ("ReLUs"), logistics, and common variations on the ReLU nonlinearity, such as parametric ReLU ("PReLU") and leaky ReLU ("LReLU"). In a more specific embodiment, the train deep embedding architecture 620 minimizes a loss function of $L=\Sigma_i(y_i-D_E(x_i))^2$, where $\Sigma_i$ indicates a sum over all of the paired examples indexed by i. In a more specific embodiment, this loss function, L, is minimized through an optimization procedure 620 where minibatches of pairs are used with a preselected stepsize, alpha, in a stochastic gradient descent on the chosen deep embedding architecture 630. In a more specific embodiment, the deep architecture parameters 630 and the optimization 620 hyperparameters are systematically perturbed over an iterative procedure to search for an improved combination of deep embedding architecture parameters 630 and the set of parameters that govern the optimization 620 that searches for the settings of one or more free parameters in the deep embedding architecture (i.e., the parameterization of one or more weights and biases and other parameters in the deep embedding architecture 630). In an embodiment, this optimization, which consists of many individual runs of training 620, is carried out with data and/or model parallelism (as is known in the art) on a multiple GPU-configured high performance computing (HPC) cluster. In this embodiment of the train deep embedding architecture module, the GPUs are often rack-mounted in a server room and/or large desktop devices that need not be mobile, and therefore there is little need to prune or compress the deep embedding architecture 630/337 for any special purpose SFF mobile or small device hardware constraints as may be required or preferred for other GPU- and/or FPGA-based devices 740/750.

The following steps of determining the network architecture for the deep embedding, and selecting optimization parameters and a training strategy are empirical, typically driven by an iterative search, and often omitted from such expositions as a process in training deep architecture, but are exposed in this discussion of training a deep embedding architecture 620 for completeness. In one embodiment of the invention, the architectural parameters of a deep architecture 630 that will approximate the embedding are chosen 620. The architectural parameters of a deep architecture 630 are parameters such as the type of architecture (convolutional neural network, recurrent neural network, deep neural network, autoencoder, etc.), the number of layers, the type of layers, the connectivity between layers, the nonlinearities of nodes within layers, and the number of nodes in each layer. In a more specific embodiment of the invention, an initial set of architectural parameters is chosen from a list of existing deep architectures. The list of existing deep architectures may be a list of deep architectures discovered empirically by trial and error through past experiments that have produced deep embedding results ($y_i$) that very closely match their formal embedding results ($y_i$) on the training data ($x_i$). In a another embodiment, the Bayesian hyperparameter optimization techniques described in the Spearmint package (Snoek, Larochelle, & Adams, 2012) are applied to architectural parameters assuming a fixed choice of optimization hyperparameters.

In one embodiment of the invention, the optimization hyperparameters of a learning technique to train 620 a deep architecture are chosen. The optimization hyperparameters of a learning technique for a deep embedding architecture are parameters that govern the process 620 of optimizing the loss function with the given deep architecture (also referred to as training the deep architecture). The process of optimization includes (1) initializing all parameters of the deep embedding architecture 630, (2) choosing a loss function, (3) iteratively reducing the loss over the optimization (i.e., learning) process, and (4) establishing criteria for completion of the optimization.

In an embodiment of the invention, an initial set of optimization hyperparameters can be chosen from a list of existing optimization hyperparameters used to successfully optimize 620 past deep architectures 630. Also in an embodiment, the initial values of the nodes of a deep architecture 630 may be chosen according to a specific convention, such as the well-known Xavier initialization (Glorot & Bengio, 2010). In a further embodiment, the loss function (L in FIG. 6) may correspond to a mean square error between the embedding of the training data and the approximation to the embedding computed by the deep architecture. In yet another embodiment, the criteria for completion of the optimization are set through early stopping, a technique known in the art that ends the optimization process when validation error on a held out set of examples begins to increase. Specifically, from the training data, a set of validation data is held out that is not used to train the deep architecture. The loss on that held-out validation set is monitored during training. As training begins, the loss on the validation data typically decreases as the deep architecture parameters are permitted to change as part of the optimization. Eventually, as the deep architecture begins to overfit, the loss on the validation data starts increasing. The optimization procedure is halted when the validation data loss increases above a predetermined threshold, where the threshold may be a function of the minimum loss achieved on the validation data and the initial loss.

In an embodiment, all other optimization hyperparameters involved in the optimization (i.e., the learning 620) process are chosen such that an initial set of optimization hyperparameters is chosen and the Bayesian hyperparameter optimization techniques described in the Whetlab and/or Spearmint packages are applied to these optimization hyperparameters assuming a fixed choice of architectural parameters. While optimization process 620 parameters include learning rate, batch size, momentum, parameters governing regularization techniques (such as dropout and/or batch normalization), parameters governing learning rate schedule and adaptivity (as used in Nesterov accelerated gradient (Nesterov & others, 2007), ADAGRAD (Duchi, Hazan, & Singer, 2011), AdaDelta (Zeiler, 2012), etc.), parameters governing normalization, and parameters governing data augmentation (such as adding noise or deforming, translating and/or rotating high dimensional objects during training), in an embodiment, an adaptive learning rate and momentum set by Nesterov's accelerated gradient with an initial stepsize of 1e−3, a batch size of 128, batch normalization, and no data augmentation or other optimization process-specific normalization can be used.

In another embodiment of the invention, both architectural parameters 630 and optimization hyperparameters 620 can be chosen to be the same as those known to produce a low loss in the learning of a similar deep embedding function (i.e., all parameters are of a deep architecture 630 are initialized by drawing random samples from distributions parameterized similarly to those used to arrive at a successful deep embedding in a past experiment). In such an embodiment, the hyperparameter optimization techniques described in the Whetlab and/or Spearmint packages can be applied to the set of all architectural 630 and optimization 620 (hyper)parameters.

Step Three: Prepare and Export the Deep Embedding Neural Network to a Device

FIG. 7 illustrates an exemplary embodiment of the modules of Step Three, the export of a deep embedding architecture module 340. A trained deep embedding architecture 337/630 may, for one or more reasons, including the size of the network, the batch size, or other reason, be impractical or incompatible with some deployed hardware. In these cases, the deep embedding architecture 337/630/715 is prepared for deployment on a small form factor (SFF) device, such as those envisioned in the present application 740/750. In an embodiment, the trained deep embedding architecture 715 existing on the training workstation 710 may be altered and/or conditioned 720 to become practical and/or compatible with the requirements of the deployment device 740/750. In one embodiment, the trained deep architecture 715 that implements the deep embedding may be deployed on a GPU-enabled SFF device 740. In another embodiment, the trained deep architecture that implements the deep embedding may be deployed on a smaller, power efficient GPU-enabled device, such as an NVIDIA Tegra chip or a System on a Chip ("SoC") 740. In another embodiment, the trained deep architecture may first be optimized 720 for use on the low power, lower resource GPU-enabled device 740. Optimization 720 for the low power, lower resource GPU-enabled device may include model compression of the trained deep architecture in the form of distillation (G. Hinton et al., 2015), and/or pruning of deep architecture weights or other parameters (Iandola et al., 2016).

The export deep embedding 340 module comprises a number of steps that ensure that the deep embedding architecture 337/630/715, or a reasonable approximation of the function $D_E(x_i) = y_i$ 337/630/715, can operate according to the requirements of the upstream 353/810 and downstream applications 357/830 on a small form factor (SFF) embedding device 347/820. The small form factor embedding device 740/750 in one embodiment is a computing device commonly identified as a system on a chip (SoC), a single board computer (SBC) containing a SoC, or an embedded device on an embedded platform (not to be confused with the concept of an embedding 325 as used in the context of the present invention). The SFF deep embedding device 820/348 is the hardware that will execute the optimized deep embedding 347 in deployment 355. It can be physically distinct (decoupled) from both upstream 353/810 and downstream 357/830 applications and can operate through communication protocols known in the art, such as publish/subscribe, UDP, TCPIP, etc., over wired and wireless (902.11* and/or Bluetooth networking connections, for instance). The SFF device 348 can be attached to the overall deployed system 350 with adhesive Velcro and be powered by a battery for mobile applications, executing entirely separately from the overall deployed system 353/357 (as a server of embedded objects in response to an input stream of high dimensional objects), or can be implemented entirely in software within the system 350 and execute on a GPU, FPGA and/or a CPU that communicates through various protocols (such as PCIe lanes) with the upstream or downstream applications.

The key distinctive hardware properties of a SFF device 740/750 are that it is typically (1) small volume (meaning that it is colloquially smaller than a desktop or laptop-sized form factor, ranging from a small chip to a smartphone equipped with a GPU 740 to a larger device that may incorporate both a GPU and and/or an FPGA 740/750), (2) light (meaning that it is commonly less massive than typical desktop or laptop-sized masses), (3) power efficient (meaning that these devices are often designed to run for hours on battery power at full load and so contain computing elements as part of the design that are designed for power efficiency, such as ARM CPU processors and power efficient GPUs and/or FPGAs) (4) limited resource (meaning that these devices have special performance considerations with respect to bandwidth of communications on the device and total memory available to the device to compute an embedding of a high dimensional object; these special performance considerations may diverge significantly from performance consideration for training a deep embedding architecture 335/620, which may have orders of magnitude faster communication fabric and available memory, for instance). In an embodiment, a SFF GPU-enabled device 740 is the NVIDIA Jetson TX1 operating with a ConnectTech Astro Carrier and Breakout board, or competing consumer product (such as a Rudi (PN ESG503) or Rosie (PN ESG501) or similar device). In another embodiment, the SFF device 750 is the Xilinx proFPGA Zync 7000 XC7Z100 FPGA Module. In yet another embodiment, the SFF device 750 is the HiTech Global Kintex Ultrascale-115. In another embodiment of an FPGA-based SFF device 750, memory is augmented with an additional memory module, such as the HiTech Global Hybrid Memory Cube. In another embodiment, the device 348 is simply a standard PC that may or may not include a GPU for execution of the optimized deep embedding architecture 347 in deployment 355. In this case, the process is similar, but the optimizations may be more limited and the deployed SFF deep embedding device 348 may be the same device as that which executes the upstream application 353/810 and/or the downstream application 357/830, in which case some other communication mechanisms may to transmit input data 354 and/or to transmit output data 356 may be handled via a software communication protocol with or without a physical communication infrastructure and associated implementation of networking communication protocols.

In an embodiment of the present invention, the optimize/compile deep embedding architecture for power efficient, low memory operation 343/720 module converts the trained deep embedding architecture 715 into an optimized/compiled deep embedding architecture representation 347 in the SFF device's 348/740/750 memory that can be accommodated by both the constraints of the SFF device 348/740/750, itself, as well as the use case requirements of the upstream 353/810 and downstream 357/830 applications. In an embodiment, the optimize/compile deep embedding architecture for power efficient, low memory operation 720 comprises a module that includes a plurality of the following modifications to the deep embedding architecture 337: (1) a pruning of deep embedding architecture weights connecting units (Iandola et al., 2016), (2) a conversion of data types parameterizing the values of the units in the deep embedding architecture from floating point to fixed point parameters (Gupta, Agrawal, Gopalakrishnan, & Narayanan, 2015), (3) a retraining of a similar, but smaller memory footprint deep embedding deployed architecture to approximate the deep embedding architecture (known in the art as a distillation of the deep embedding architecture (G. Hinton et al., 2015), (4) a reconfiguration of the operational batch size to process fewer images per batch in its deployed mode of operation 355, (5) a compilation of the deep embedding architecture into an optimized set of instructions that allows parallel computation in reduced or limited memory configurations, (6) an optimization of the SFF device's cross-device communications and scheduling, such as the reduction of sequential wait times for intermediate results in the execution process, the minimization of execution lag due to scheduling cross-device communications, and/or the minimization of execution lag due to scheduling cross-component within-device communications, (7) a conversion of a deep embedding architecture into a fully convolutional network (Long, Shelhamer, & Darrell, 2015), (8) an optimization for inference performance rather than training performance, and/or (9) a combination of (1)-(8) above. The resulting optimized/compiled deep embedding architecture 347 comprises a function ($D_d(x_i)=a_i$) that executes on the SFF device 355 that approximately reproduces the behavior of the deep embedding architecture 337 for input $x_i$. Specifically, in some steps of the optimization/compilation 343/720, the difference between the deploy-mode output, $a_i$ 347, and the deep embedding architecture's output, $y_i$ 337, may be minimized 720 explicitly or implicitly, such that the optimization/compilation 720 of the deep embedding architecture 343 effects a second kind of loss function minimization, where the loss function, $L_d$, is approximately $L_d = S_i(y_i-a_i)^2$. The export deep embedding architecture 345/730 module uses known communication protocols to transfer the optimized/compiled deep embedding architecture 347 onto the SFF deep embedding device 348/740/750 for operation 355.

Step Four: Deploy the Deep Embedding Neural Network

FIG. 8 illustrates an exemplary embodiment of the modules of Step Four, the deployment of a deep embedding device module 350 in an application 353/357/810/830. In this step 350, the optimized/compiled deep embedding architecture 347 is deployed 355/820. In an embodiment, the deployed SFF deep embedding device 355/820 accepts through an input stream high dimensional objects, $x_s$ 354, from an upstream application 353/810. In a more specific embodiment, the SFF deep embedding device 820 communicates with the upstream application 810 through a wired high bandwidth communication channel, such as Ethernet (RJ45) through a communication protocol known in the art to be appropriate for such transfer, such as UDP, for example. In another embodiment, for each input high dimensional object, $x_s$ 354, received from the upstream application 353/810 the deployed SFF deep embedding device 355/820 produces exactly one low dimensional embedding, $a_s$ 356, of that high dimensional object. In an embodiment of the invention, the resulting stream of outputs 356 is passed to a downstream application consuming the embedded objects 830.

Leveraging Embedding for Faster and/or More Accurate Labeling

In one embodiment, leveraging a deep embedding for labeling includes the following steps (1) the computation of a high quality embedding that captures reliable label-specific image similarities in a collection of high dimensional objects 320 (2) the use of a graphical user interface that enables the association of at least one specific label 311/420 with at least one specific high dimensional object 311/410 and may include (3) the use of a second graphical user interface that allows a user to associate the same specific label to a plurality of other objects that may be close in the embedded space 530/356. The definition of close may be user-driven and may be, for example, a distance threshold from the specific high dimensional object in the embedded space, a count of the number of objects from the closest to the furthest in rank order (say, the closest 10 objects in the embedded space), or may be user-selected via a graphical user interface. In one embodiment, the user is provided a view of every high dimensional object 311/410/510 corresponding to every embedded object 520 in sequence of increasing distance in the embedded space. The user views objects 510 (one view at a time or in group views ordered by distance in the embedded space) and decides only whether all objects in the current view inherit the specific label 420. In this way, the benefits of the embedding 325/530 and the specific label 420 per cluster in the embedding 325/530 increase the throughput of an individual user labeling large collections of images 311/410 in a corpus.

Benefits of Using Deep Embedding for Labeling

The benefits of using a deep embedding for this task are multiple. One benefit is that when new high dimensional objects (images) are added to the corpus to be labeled, the existing labels of nearby objects in the embedded space can be computed quickly and repeatably without recomputing or changing any existing labeled object embeddings, which is not generally possible with high quality formal embeddings in the prior art or taxonomy above. The second benefit is that a deployed deep embedding 355 can be used as a visual feedback mechanism in the labeling process, itself. Specifically, when new unlabeled objects 354 are added to a corpus, the embeddings of these 356 can be marked visually with a different color or marker to illustrate their state in the labeling process. For instance, unlabeled objects 356 may simply be marked in the graphical interface with a specific color or marker indicating they have not yet been labeled. Unlabeled objects 356 that are embedded inside a tight cluster of identical labels 311/420 may be labeled with a marker that indicates high confidence in the inferred label (based on a selection of the labels and distances of the closest labeled objects in the embedded space). Unlabeled objects that are embedded between clusters that may contain a number of different labels 311/420 may be labeled with a marker that indicates low confidence in the inferred label (based on a selection of the labels of and distances of the closest labeled objects in the embedded space). In one embodiment, the user is presented simultaneous views of high dimensional objects 311/410/510 on one screen, and the visualization of the deep embedding of both labeled 311 and unlabeled embedded data 356 on a separate screen (for example, as a 2D or 3D scatterplot). These views are coordinated and synchronized, so that view selections on both screens can be coordinated for labeling purposes. For instance, selecting a point on the screen with the embedding visualization ($a_s$ 356 and/or $a_i$) can cause a view of the corresponding high dimensional object ($x_s$ 354 and/or $x_i$, respectively) to be presented on the other screen. Similarly, selecting multiple points on the screen with the embedding visualization ($a_s$ 356 and/or $a_i$) with a selection tool (such as a user-selected rectangle, user-drawn lasso, or individual point and a criterion for a group view, such as maximum embedded distance or number of closest objects in the embedded space, for instance) can cause a group view of the corresponding high dimensional objects ($x_s$ 354 and/or $x_i$, respectively) to be presented on the other screen for manual labeling. The screen containing the embedded visualization may have zoom, rotate, select and flythrough user interface controls to assist the user in selecting and/or filtering points for the corresponding high dimensional object view. Both screens may have controls to label 311/420 any given selection of objects 354/356/311/327. A third benefit of the deep embedding for an individual user is that the visual landscape of the visualized embedding becomes fixed after it is computed, so that a user need not relearn the shape or other idiosyncratic characteristics of the embedding every time new unlabeled data is added to the corpus for labeling, improving both the user's labeling speed and accuracy as proficiency with the specific tool and learned characteristics of the embedding is memorized with successive labeling exposures.

Leveraging Embedding for Translation of Modeled Image Sensor Data

Sparse (often high cost) labeled image data from an operational imaging sensor is available for supervised learning of a task (say, object recognition). In some modalities, such as synthetic aperture radar ("SAR"), techniques can be used to produce synthetic SAR images, for instance (akin to virtual reality rendering engines producing visually realistic renderings of scenes in the spectrum of visual imaging). However, due to approximations and gaps in the known phenomenology of various imaging systems, all rendering engines produce synthetic images that differ in idiosyncratic and systematic ways from real sensor images. It has been shown that deep learning techniques for object recognition, for instance, can reliably separate a real sensor image from a synthetic image of the same object, even after controlling for as many imaging conditions as can be incorporated into the rendering engine. Perceptually, human observers of synthetic images are also distracted by this same phenomenon differentiating real sensor and synthetic images. This phenomenon has been termed "the uncanny valley." While expanding the size of a training corpus by generating synthetic data is taught away from, it has been observed in experiments that the submanifolds and manifolds of collections of real sensor and synthetic image data 327 can be related by a separate translation function that can be learned (undisclosed experimental results). While the technique for translating images across sensor modalities is beyond the scope of the present invention, the deployed use case 350 is outlined in the context of the present invention. Specifically, it has been observed for machine translation of natural language, for instance, that calculations on embedded vectors 356 for words 354 can be used to learn a translation function. For example, with a technique called word2vec (where vec("word" 354) 356 indicates the learned embedded representation of a particular word), vec("Madrid" 354) 356−vec("Spain" 354) 356+vec("France" 354) 356 produces an embedded representation that is closer to vec ("Paris") than any other word's embedded representation. Similarly, if pairs of synthetic and corresponding real sensor images 311/410/510 are available (this can be accomplished by rendering a plurality of synthetic images to match real sensor images from recorded acquisition geometries), a function can be learned that can convert synthetic images into images that fall closer to the real sensor image manifold. Specifically, it has been shown that a variational autoencoder can be trained to minimize a loss function that measures the difference between real sensor images and synthetic images. The loss function is commonly cross entropy or mean square error. However, for the reasons described above, these loss functions applied directly to images are often problematic. Further, because the process of computing a loss may be repeated thousands to millions of times, for a loss to be useful for learning an autoencoder or other function, the loss computation must be fast, repeatable and faithfully represent similarity. The deployed deep embedding device 355/820 enables such an embedded loss to be computed repeatedly when training the autoencoder 810/830. After training the autoencoder 810/830 to a desired accuracy, synthetic images can be converted into a translated representation that better approximates real sensor images. Thus, the benefit of deep embedding in this application 350 is to exploit the speed and repeatability of the computation of the similarity metric in the embedded space. Further, because a deep architecture can be chosen to be fully differentiable, and a gradient of the loss is required for many optimization techniques, the deep embedding can be used directly in the training of an autoencoder for translation 810/830.

Embodiments of the present invention can be deployed 350 to compute a repeatable representation for a similarity metric 356 from which a translation of image manifolds can be learned 357. This image translator (a trained encoder-decoder architecture, for instance) can later be used to translate images from one domain (say, synthetically rendered SAR from CAD models) to another (say, real SAR images acquired from a real operational imaging sensor imaging a real object) in lieu of collecting and labeling large amounts of real observed SAR data of real objects (which may be prohibitively expensive/costly both to acquire and label), large quantities of synthetic SAR model data can be generated quickly with a CAD model of a vehicle (like a motorcycle, for instance) and then translated into the real observed SAR data space with the trained encoder-decoder translation architecture.

Deployment

The present invention can be deployed 350 as a component of a system that operates as a module that takes as input a high dimensional object (or objects), $x_s$ 354, and computes the embedding of the high dimensional object (or objects), $a_s$ 356. This module need not be capable of computing a formal embedding 325, but need only reproduce the operations required to convert a high dimensional object into its embedded representation 337/347—i.e., it need only carry out the operations in the deep embedding architecture that converts a high dimensional object, $x_s$ 354, to its low dimensional embedding, $a_s$ 356. This deep embedding can be deployed on GPU-enabled 740 or FPGA-enabled 750 hardware 348/355 to compute 355 embedded representations of new high dimensional object data 354 not used to train 335 the deep embedding module 333. In one embodiment, the learn deep embedding architecture module 330 can be a software module configured separately from the upstream host process 353 that provides a stream of high dimensional object data 354, and the services that consume 357 the corresponding low dimensional embedded outputs 356 of the deep embedding software module. In this embodiment, the deep embedding may share data through host RAM or other volatile memory component, through disk access via files, or some other means on the deployed system 350 without a physically distinct deployed SFF deep embedding device 355. In another embodiment, the deep embedding module can be a physically separate device 355, which may be a detachable hardware component with its own power source (such as a battery or other electrical power supply). In this embodiment, the deployed deep embedding device 355 can be connected to a host system via Ethernet or via a low latency, high throughput communication channel (such as Mellanox or Infiniband fabric) to receive a stream of high dimensional object data and associated metadata 354 from an upstream process 353 on the host system 350. In an embodiment of the deployed deep embedding module, the communication protocol at the system level between the host 350 and deployed deep embedding device 355 is a publish/subscribe method (i.e., a pub-sub method such as Java Message Passing, or another messaging protocol). In an embodiment, the low dimensional embedding output and associated metadata 356 of the deep embedding module for each high dimensional input object 354 is communicated over the same communication channel and hardware as the input to the host and/or other services 350/353/357. In another embodiment, the low dimensional embedding output 356 of the deployed deep embedding device 355 for each high dimensional input object 354 is communicated over a different communication channel (or channels) to downstream services 357/830 that consume only the low dimensional embeddings 356 of the high dimensional objects. In yet another embodiment, the deep embedding is computed on a very low power GPU-enabled SFF device 740 (such as a Tegra GPU), or on a power-optimized FPGA-enabled device 750 (such as a Xilinx-based processor or coprocessor).

Benefits of the Embodiments

Deep embedding provides a modular method and system 310/320/330/340/350 to compute faithful (high quality) approximations 356 to formal embeddings 325. Deep embeddings are fast to compute. They are reproducible (i.e., deterministic), and they can be used as similarity metrics to enable a variety of other applications, such as (1) a representation that can be used in conjunction with a labeling system that can improve both the quantity and accuracy of labels associated with high dimensional object data such as images; and/or (2) a representation that enables the practical use of the embedded representation for the purposes of computing a loss when training a translation function between high dimensional object data.

Computing Device

FIG. 9 is a block diagram of an exemplary embodiment of a Computing Device 900 in accordance with the present invention, which in certain operative embodiments can comprise, for example, Deep Analyzer 317, Deep Embedding Architecture 337, SFF Deep Embedding Device 348, Deployed SFF Deep Embedding Device 355, Deep Analyzer Network 440, Deep Embedding Architecture 630, Training Workstation 710, Deep Embedding Architecture 715, GPU-Based SFF Device 740, and/or FPGA-Based SFF Device 750. Computing Device 900 can comprise any of numerous components, such as for example, one or more Network Interfaces 910, one or more Memories 920, one or more Processors 930, program Instructions and Logic 940, one or more Input/Output ("I/O") Devices 950, and one or more User Interfaces 960 that may be coupled to the I/O Device(s) 950, etc.

Computing Device 900 may comprise any device known in the art that is capable of processing data and/or information, such as any general purpose and/or special purpose computer, including as a personal computer, workstation, server, minicomputer, mainframe, supercomputer, computer terminal, laptop, tablet computer (such as an iPad), wearable computer, mobile terminal, Bluetooth device, communicator, smart phone (such as an iPhone, Android device, or BlackBerry), a programmed microprocessor or microcontroller and/or peripheral integrated circuit elements, a high speed graphics processing unit, an ASIC or other integrated circuit, a hardware electronic logic circuit such as a discrete element circuit, and/or a programmable logic device such as a PLD, PLA, FPGA, or PAL, or the like, etc. In general, any device on which a finite state machine resides that is capable of implementing at least a portion of the methods, structures, API, and/or interfaces described herein may comprise Computing Device 900.

Memory 920 can be any type of apparatus known in the art that is capable of storing analog or digital information, such as instructions and/or data. Examples include a non-volatile memory, volatile memory, Random Access Memory, RAM, Read Only Memory, ROM, flash memory, magnetic media, hard disk, solid state drive, floppy disk, magnetic tape, optical media, optical disk, compact disk, CD, digital versatile disk, DVD, and/or RAID array, etc. The memory device can be coupled to a processor and/or can store instructions adapted to be executed by processor, such as according to an embodiment disclosed herein. In certain embodiments, Memory 920 may be augmented with an additional memory module, such as the HiTech Global Hybrid Memory Cube.

Input/Output (I/O) Device 950 may comprise any sensory-oriented input and/or output device known in the art, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, vibrator, tactile simulator, and/or tactile pad, optionally including a communications port for communication with other components in Computing Device 900.

Instructions and Logic 940 may comprise directions adapted to cause a machine, such as Computing Device 900, to perform one or more particular activities, operations, or functions. The directions, which can sometimes comprise an entity called a "kernel", "operating system", "program", "application", "utility", "subroutine", "script", "macro", "file", "project", "module", "library", "class", "object", or "Application Programming Interface," etc., can be embodied as machine code, source code, object code, compiled code, assembled code, interpretable code, and/or executable code, etc., in hardware, firmware, and/or software. Instructions and Logic 940 may reside in Processor 930 and/or Memory 920.

Network Interface 910 may comprise any device, system, or subsystem capable of coupling an information device to a network. For example, Network Interface 910 can comprise a telephone, cellular phone, cellular modem, telephone data modem, fax modem, wireless transceiver, Ethernet circuit, cable modem, digital subscriber line interface, bridge, hub, router, or other similar device.

Processor 930 may comprise a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. Processor 930 can function as a central processing unit, local controller, remote controller, parallel controller, and/or distributed controller, etc.

Processor 930 can comprise a general-purpose computing device, including a microcontroller and/or a microprocessor. In certain embodiments, the processor can be dedicated purpose device, such as an Application Specific Integrated Circuit (ASIC), a high speed Graphics Processing Unit (GPU) or a Field Programmable Gate Array (FPGA) that has been designed to implement in its hardware and/or firmware at least a part of an embodiment disclosed herein. In certain embodiments, Processor 930 can be a Tegra X1 processor from NVIDIA. In other embodiments, Processor 930 can be a Jetson TX1 processor from NVIDIA, optionally operating with a ConnectTech Astro Carrier and Breakout board, or competing consumer product (such as a Rudi (PN ESG503) or Rosie (PN ESG501) or similar device). In another embodiment, the SFF device 750 is the Xilinx proFPGA Zync 7000 XC7Z100 FPGA Module. In yet another embodiment, Processor 930 can be a HiTech Global Kintex Ultrascale-115. In still another embodiment, Processor 930 can be a standard PC that may or may not include a GPU to execute an optimized deep embedding architecture.

User Interface 960 may comprise any device and/or means for rendering information to a user and/or requesting information from the user. User Interface 960 may include, for example, at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, auto-sizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

The present invention can be realized in hardware, software, or a combination of hardware and software. The invention can be realized in a centralized fashion in one computer system, or in a distributed fashion where different elements are spread across several computer systems. Any kind of computer system or other apparatus adapted for carrying out the methods described herein is suitable. A typical combination of hardware and software can be a general-purpose computer system with a computer program that, when being loaded and executed, controls the computer system such that it carries out the methods described herein.

Although the present disclosure provides certain embodiments and applications, other embodiments apparent to those of ordinary skill in the art, including embodiments that do not provide all of the features and advantages set forth herein, are also within the scope of this disclosure.

The present invention, as already noted, can be embedded in a computer program product, such as a computer-readable storage medium or device which when loaded into a computer system is able to carry out the different methods described herein. "Computer program" in the present context means any expression, in any language, code or notation, of a set of instructions intended to cause a system having an information processing capability to perform a particular function either directly or indirectly after either or both of the following: a) conversion to another language, code or notation; or b) reproduction in a different material form.

The foregoing disclosure has been set forth merely to illustrate the invention and is not intended to be limiting. It will be appreciated that modifications, variations and additional embodiments are covered by the above teachings and within the purview of the appended claims without departing from the spirit and intended scope of the invention. Other logic may also be provided as part of the exemplary embodiments but are not included here so as not to obfuscate the present invention. Since modifications of the disclosed embodiments incorporating the spirit and substance of the invention may occur to persons skilled in the art, the invention should be construed to include everything within the scope of the appended claims and equivalents thereof.

REFERENCES

*Amazon Mechanical Turk—Welcome*. (n.d.). Retrieved Sep. 25, 2016, from https://www.mturk.com/mturk/welcome.

Belkin, M., & Niyogi, P. (2007). *Convergence of Laplacian eigenmaps*. Advances in Neural Information Processing Systems, 19, 129.

Bengio, Y., Paiement, J. F., Vincent, P., Delalleau, O., Le Roux, N., & Ouimet, M. (2004). *Out-of-sample extensions for lle, isomap, mds, eigenmaps, and spectral clustering*. Advances in Neural Information Processing Systems, 16, 177-184.

Chaudhury, K. N. (2013). *Acceleration of the shiftable algorithm for bilateral filtering and nonlocal means*. IEEE Transactions on Image Processing, 22(4), 1291-1300.

Cook, J., Sutskever, I., Mnih, A., & Hinton, G. E. (2007). *Visualizing Similarity Data with a Mixture of Maps*.

AISTATS (Vol. 7, pp. 67-74). Retrieved from http://www.jmlr.org/proceedings/papers/v2/cook07a/cook07a.pdf.

De Ridder, D., & Duin, R. P. (1997). *Sammon's mapping using neural networks: a comparison*. Pattern Recognition Letters, 18(11), 1307-1316.

Demartines, P., & Hérault, J. (1997). *Curvilinear component analysis: A self-organizing neural network for nonlinear mapping of data sets*. IEEE Transactions on Neural Networks, 8(1), 148-154.

Duchi, J., Hazan, E., & Singer, Y. (2011). *Adaptive subgradient methods for online learning and stochastic optimization*. The Journal of Machine Learning Research, 12, 2121-2159.

Glorot, X., & Bengio, Y. (2010). *Understanding the difficulty of training deep feedforward neural networks*. AISTATS (Vol. 9, pp. 249-256). Retrieved from http://www.jmlr.org/proceedings/papers/v9/glorot10a/glorot10a.pdf?hc_location=ufi.

Gupta, S., Agrawal, A., Gopalakrishnan, K., & Narayanan, P. (2015). *Deep learning with limited numerical precision*. CoRR, Abs/1502.02551, 392. Retrieved from http://www.jmlr.org/proceedings/papers/v37/gupta15.pdf.

Hinton, G. E., & Roweis, S. T. (2002). *Stochastic neighbor embedding*. Advances in neural information processing systems (pp. 833-840). Retrieved from http://machine-learning.wustl.edu/mlpapers/paper_files/AA45.pdf.

Hinton, G. E., & Salakhutdinov, R. R. (2006). *Reducing the dimensionality of data with neural networks*. Science, 313(5786), 504-507.

Hinton, G., Vinyals, O., & Dean, J. (2015). *Distilling the knowledge in a neural network*. arXiv Preprint arXiv: 1503.02531. Retrieved from http://arxiv.org/abs/1503.02531.

Iandola, F. N., Moskewicz, M. W., Ashraf, K., Han, S., Daily, W. J., & Keutzer, K. (2016). *SqueezeNet: AlexNet-level accuracy with 50x fewer parameters and <1 MB model size*. arXiv Preprint arXiv:1602.07360. Retrieved from http://arxiv.org/abs/1602.07360.

Ioffe, S., & Szegedy, C. (2015). Batch normalization: *Accelerating deep network training by reducing internal covariate shift*. arXiv Preprint arXiv:1502.03167. Retrieved from http://arxiv.org/abs/1502.03167.

Krizhevsky, A., Sutskever, I., & Hinton, G. (2012). *Imagenet classification with deep convolutional neural networks*. Advances in Neural Information Processing Systems 25 (pp. 1106-1114). Retrieved from http://books.nips.cc/papers/files/nips25/NIPS2012_0534.pdf.

LabelMe. *The Open annotation tool*. (n.d.). Retrieved Sep. 23, 2016, from http://labelme.csail.mit.edu/Release3.0/browserTools/php/mechanical_turk.php.

Lee, J. A., & Verleysen, M. (2007). *Nonlinear Dimensionality Reduction*. Springer Science & Business Media.

Long, J., Shelhamer, E., & Darrell, T. (2015). *Fully convolutional networks for semantic segmentation*. Proceedings of the IEEE Conference on Computer Vision and Pattern Recognition (pp. 3431-3440). Retrieved from http://www.cv-foundation.org/openaccess/content_cvpr_2015/html/Long_Fully_Convolutional_Networks_2015_CVPR_paper.html.

Lowe, D. G. (1999). *Object recognition from local scale-invariant features*. Computer vision, 1999. Proceedings of the Seventh IEEE International Conference on (Vol. 2, pp. 1150-1157). IEEE. Retrieved from http://ieeexplore.ieee.org/xpls/abs_all.jsp?arnumber=790410.

Mikolov, T., Le, Q. V., & Sutskever, I. (2013). *Exploiting similarities among languages for machine translation*. arXiv Preprint arXiv:1309.4168. Retrieved from http://arxiv.org/abs/1309.4168.

Nesterov, Y., & others. (2007). *Gradient methods for minimizing composite objective function*. UCL. Retrieved from http://dial.uclouvain.be/handle/boreal:5122.

Norouzi, M., Mikolov, T., Bengio, S., Singer, Y., Shlens, J., Frome, A., . . . Dean, J. (2013). *Zero-shot learning by convex combination of semantic embeddings*. arXiv Preprint arXiv:1312.5650. Retrieved from http://arxiv.org/abs/1312.5650.

Roweis, S. T., & Saul, L. K. (2000). *Nonlinear dimensionality reduction by locally linear embedding*. Science, 290(5500), 2323-2326.

Shepard, R. N. (1980). *Multidimensional scaling, tree-fitting, and clustering*. Science, 210(4468), 390-398.

Snoek, J., Larochelle, H., & Adams, R. P. (2012). *Practical bayesian optimization of machine learning algorithms*. Advances in neural information processing systems (pp. 2951-2959). Retrieved from http://papers.nips.cc/paper/4522-practical.

Song, L., Gretton, A., Borgwardt, K. M., & Smola, A. J. (2007). *Colored maximum variance unfolding*. Advances in neural information processing systems (pp. 1385-1392). Retrieved from http://machinelearninelearning.wustl.edu/mlpapers/paper_files/NPS2007_492.pdf.

Sun, B., & Saenko, K. (2014). *From Virtual to Reality: Fast Adaptation of Virtual Object Detectors to Real Domains*. BMVC (Vol. 1, p. 3). Retrieved from http://www.bmva.org/bmvc/2014/files/paper062.pdf.

*Uncanny valley*. (2016, Sep. 11). Wikipedia, the free encyclopedia. Retrieved from https://en.wikipedia.org/w/index.php?title=Uncanny_valley&oldid=738941388.

Van Der Maaten, L. (2009). *Learning a parametric embedding by preserving local structure*. RBM, 500, 500.

Van Der Maaten, L. (2013). *Barnes-hut-sne*. arXiv Preprint arXiv:1301.3342. Retrieved from http://arxiv.org/abs/1301.3342.

Van Der Maaten, L. (2014). *Accelerating t-SNE using tree-based algorithms*. Journal of Machine Learning Research, 15(1), 3221-3245.

Van der Maaten, L., & Hinton, G. (2008). *Visualizing data using t-SNE*. Journal of Machine Learning Research, 9(2579-2605), 85.

Wang, J., Song, Y., Leung, T., Rosenberg, C., Wang, J., Philbin, J., . . . Wu, Y. (2014). *Learning fine-grained image similarity with deep ranking*. Proceedings of the IEEE Conference on Computer Vision and Pattern Recognition (pp. 1386-1393). Retrieved from http://www.cv-foundation.org/openaccess/content_cvpr_2014/html/Wang_Learning_Fine-grained_Image_2014_CVPR_paper.html.

Weinberger, K. Q., & Saul, L K. (2006). *An introduction to nonlinear dimensionality reduction by maximum variance unfolding*. AAAI (Vol. 6, pp. 1683-1686). Retrieved from http://www.aaai.org/Papers/AAAI/2006/AAAI06-280.pdf.

Zeiler, M. D. (2012). ADADELTA: *An adaptive learning rate method*. arXiv Preprint arXiv:1212.5701. Retrieved from http://arxiv.org/abs/1212.5701.

The invention claimed is:

1. A system for generating a low-dimensional summary vector representation of a high-dimensional data object in a computer memory, comprising:

a first processor in communication with a first computer readable memory;

an object embedding module embodied in the first computer readable memory, wherein the object embedding module, when executed by the first processor, creates an embedding of a plurality of high-dimensional training data objects, each of the plurality of high-dimensional training data objects comprising a different representation of an actual object, where the embedding comprises a set of ordered pairs, each ordered pair comprising one of the plurality of high-dimensional training data objects and a corresponding low-dimensional training vector created by a selected embedding algorithm operating within the object embedding module;

a second processor in communication with a second computer readable memory;

a deep architecture training module embodied in the second computer readable memory, wherein the deep architecture training module, when executed by the second processor, trains a neural network with the set of ordered pairs to produce a deterministic deep architecture function that can substantially replicate the embedding;

a third processor in communication with a third computer readable memory; and a deep architecture deployment module embodied in the third computer readable memory, wherein the deep architecture deployment module, when executed by the third processor:

receives a high dimensional input data object from an external data source, said high-dimensional input data object obtained from an observation of a physical object, and invokes the deep architecture function to generate a low-dimensional summary vector representation of the received high-dimensional input data object.

2. The system of claim 1, wherein the actual object corresponds to an observed phenomenon.

3. The system of claim 1, wherein the actual object corresponds to a computer-generated model.

4. The system of claim 1, wherein the selected embedding algorithm is nondeterministic.

5. The system of claim 1, wherein the selected embedding algorithm corresponds to at least one of the following embedding algorithms: (1) tSNE; (2) PCA; (3) CCA; (4) Sammon Mapping; (5) Multidimensional Scaling; (6) Locally Linear Embedding; (7) ISOMAP; (8) Clustering; (9) Energy Minimization; (10) Force-graph Equilibrium; and (11) MVU.

6. The system of claim 1, wherein the dimensionality of the low-dimensional training vector is less than the dimensionality of any of the high-dimensional training data objects.

7. The system of claim 1, wherein the deep architecture function generates the same low-dimensional summary vector each time it receives the same high-dimensional input data object.

8. The system of claim 1, wherein each of the plurality of high-dimensional training data objects includes a label and each of the low-dimensional training vectors retains the label of its corresponding high-dimensional training data object.

9. The system of claim 8, further comprising:
labeling the received high-dimensional input data object based on its low-dimensional summary vector.

10. The system of claim 9, further comprising:
recognizing the received high-dimensional input data object based on its label.

11. The system of claim 1, wherein the first computer memory and the second computer memory share the same physical memory space.

12. The system of claim 1, wherein some of the plurality of high-dimensional training data objects are synthetically generated and wherein the object embedding module translates each of the synthetically generated high dimensional training data objects into a more realistic high dimensional training data object before creating the embedding.

* * * * *